Figure 1:
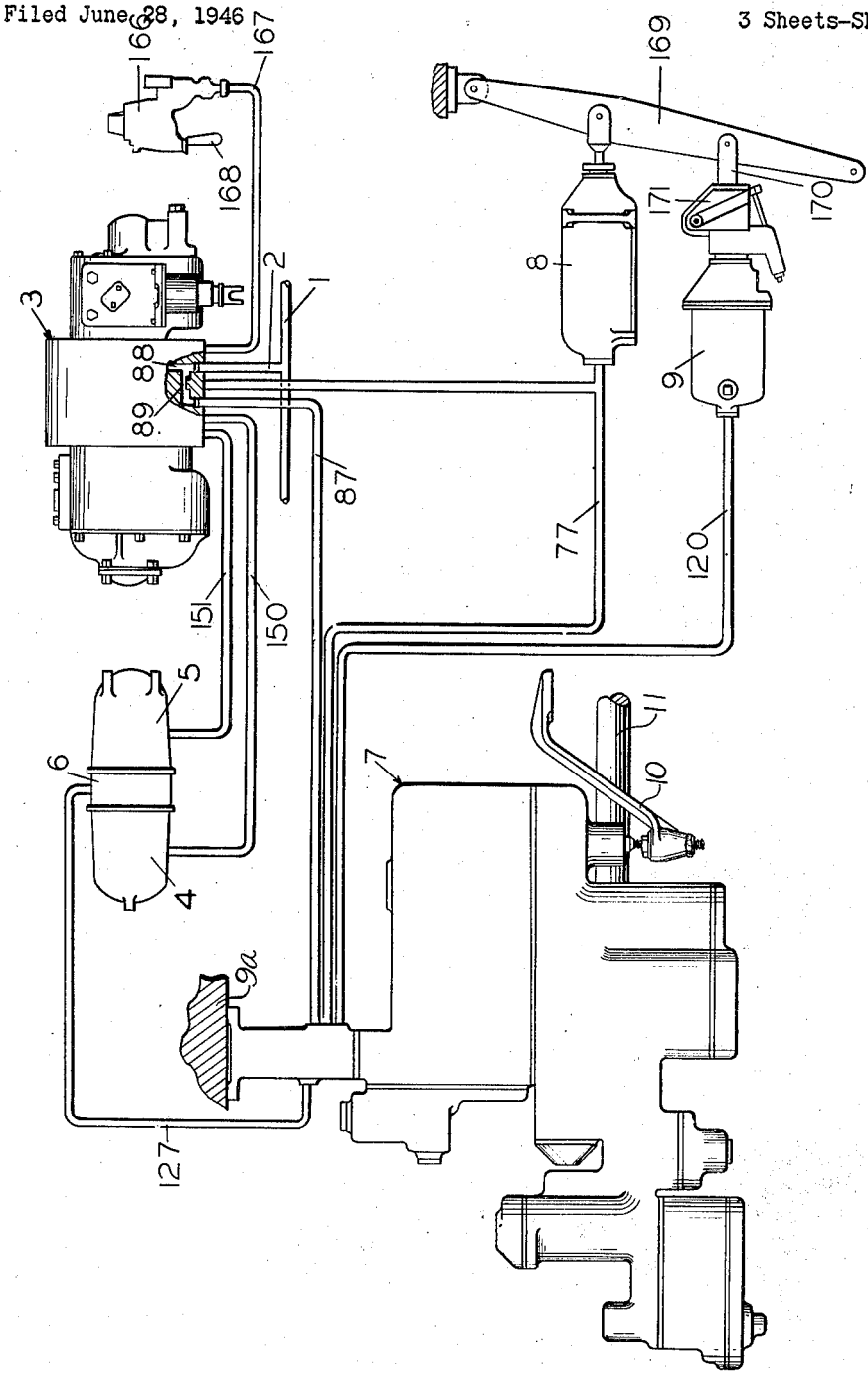

July 18, 1950 — G. T. McCLURE — 2,515,963
VARIABLE LOAD BRAKE
Filed June 28, 1946 — 3 Sheets-Sheet 1

INVENTOR
GLENN T. McCLURE
BY
ATTORNEY

July 18, 1950
G. T. McCLURE
2,515,963
VARIABLE LOAD BRAKE
Filed June 28, 1946
3 Sheets-Sheet 2
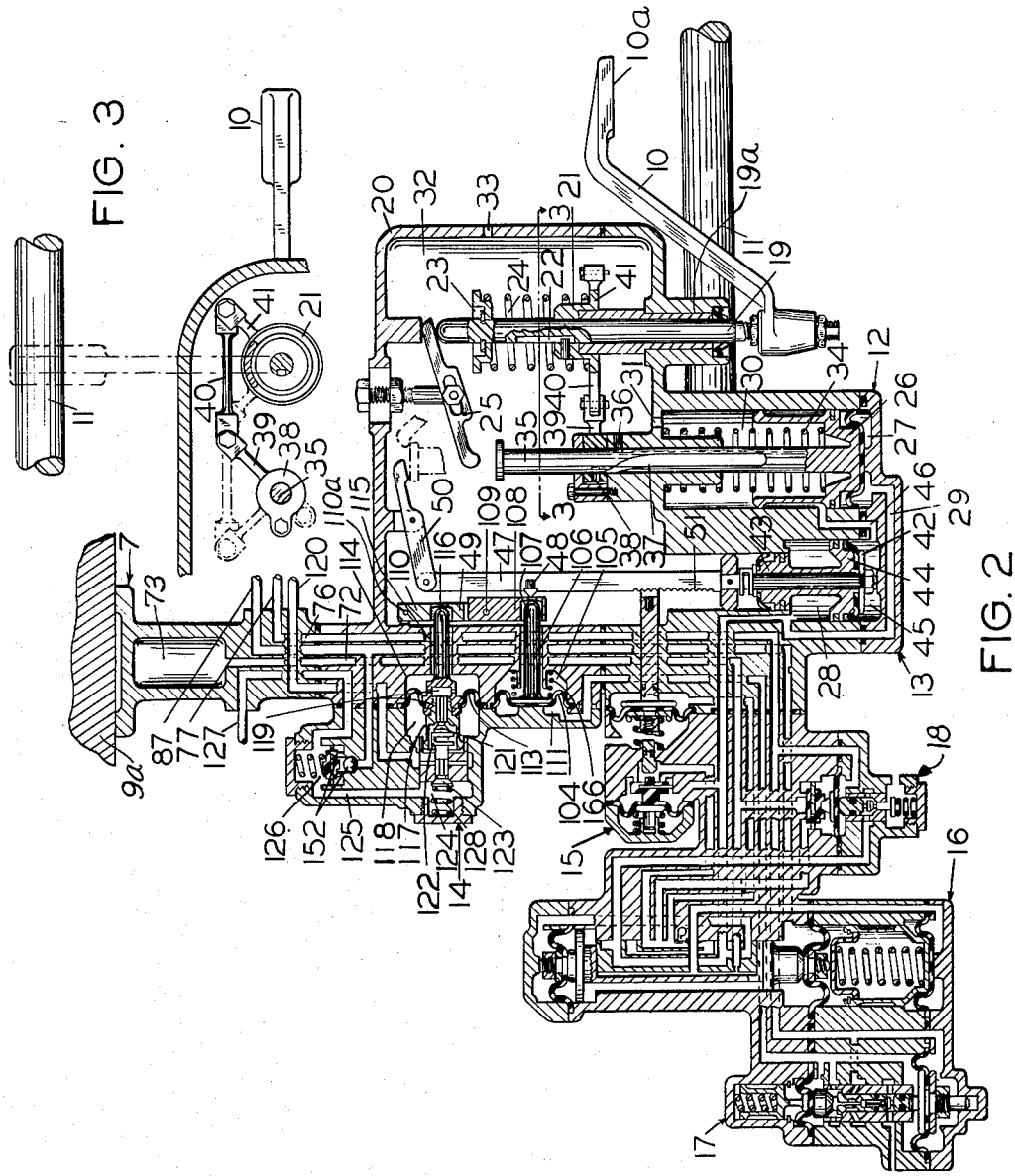
INVENTOR
GLENN T. McCLURE
BY
Frank E. Miller
ATTORNEY July 18, 1950

G. T. McCLURE 2,515,963

VARIABLE LOAD BRAKE

Filed June 28, 1946

3 Sheets-Sheet 3

*INVENTOR*
GLENN T. McCLURE
BY
*ATTORNEY*

Patented July 18, 1950

2,515,963

UNITED STATES PATENT OFFICE 2,515,963

VARIABLE LOAD BRAKE

Glenn T. McClure, McKeesport, Pa., assignor to The Westinghouse Air Brake Company, Wilmerding, Pa., a corporation of Pennsylvania Application June 28, 1946, Serial No. 680,279

41 Claims. (Cl. 303—22)

This invention relates to variable load brake equipment for vehicles, and more particularly to that type of equipment which is constructed and arranged to be automatically adjusted or conditioned to vary the braking force according to the position that the vehicle body, under various loads, assumes relative to a fixed part of a truck.

The present trend toward the use of light weight materials in the construction of railway freight cars has resulted in much higher ratios of gross weight to tare weight than ever before encountered. Since the braking force in relation to the weight of an empty car must be such as to avoid wheel sliding and excessive train shock, the braking force on lighter weight cars will consequently have to be lower than heretofore. Because the gross weight is limited only by the load limit for the trucks, which remain unchanged, the lower braking force will be inadequate for proper control of such cars when loaded.

The principal object of this invention, therefore, is to provide a variable load brake equipment which will operate in conjunction with the present type of fluid pressure brake equipment so that the braking force will be sufficiently low on an empty car to prevent wheel sliding and will be increased in relation to any increase in the gross weight of the car so that a loaded or partially loaded car may be properly controlled in a train. Another object is to provide a variable load brake equipment which will operate in conjunction with the standard fluid pressure freight brake equipment to obtain the present application and release time intervals on a car without altering the flow capacities of any passages in the present standard freight brake equipment.

Still another object is to provide a variable load brake equipment of the type employing two brake cylinders in which the fluid pressure may be varied, the pressure in one of the brake cylinders for any given application being proportioned according to the weight of the load carried by the vehicle.

A still further object is to provide a variable load brake equipment which will provide in the brake cylinders substantially the same fluid pressure curve characteristics as in the standard brake cylinder regardless of the loading on the vehicle.

Another object is to provide a variable load brake equipment which will maintain substantially the proper ratio between the reduction in brake pipe pressure and the braking force obtained per pound reduction in brake pipe pressure.

Another object is to provide a load compensating, or variable load, fluid pressure brake equipment having a cut-off valve portion which is arranged to cut off the flow of fluid under pressure from the brake pipe at a high pressure when the pressure is increasing from below a predetermined value and to establish the flow of fluid under pressure from the brake pipe at a predetermined low pressure when brake pipe is being reduced.

A further object is to provide a load compensating, or variable load, fluid pressure brake equipment of the variable leverage relay valve type, in which the means for positioning the fulcrum for the relay valve will actuate said fulcrum to a position for braking an empty vehicle prior to the operation of positioning the fulcrum for obtaining a braking power corresponding to the load on the vehicle, thus ensuring that, in the event of failure of the load measuring mechanism to operate, the car will be safely underbraked rather than dangerously overbraked.

Another object is to provide in a load compensating brake of the above type which includes a mechanism for locking the fulcrum in its adjusted position, a means for biasing the fulcrum toward a position for braking an empty vehicle, which means is effective only during the adjusting period so that strain on the locking mechanism will be eliminated at all other times.

Still another object is to provide a load compensating fluid pressure brake including means for preventing the operation of adjusting the variable mechanism according to the weight of the load until the pressure of fluid in the empty brake cylinder has been reduced to some predetermined low degree, thus preventing the subjecting of the adjusting apparatus to undue stresses while the adjusting is taking place.

Figure 4:
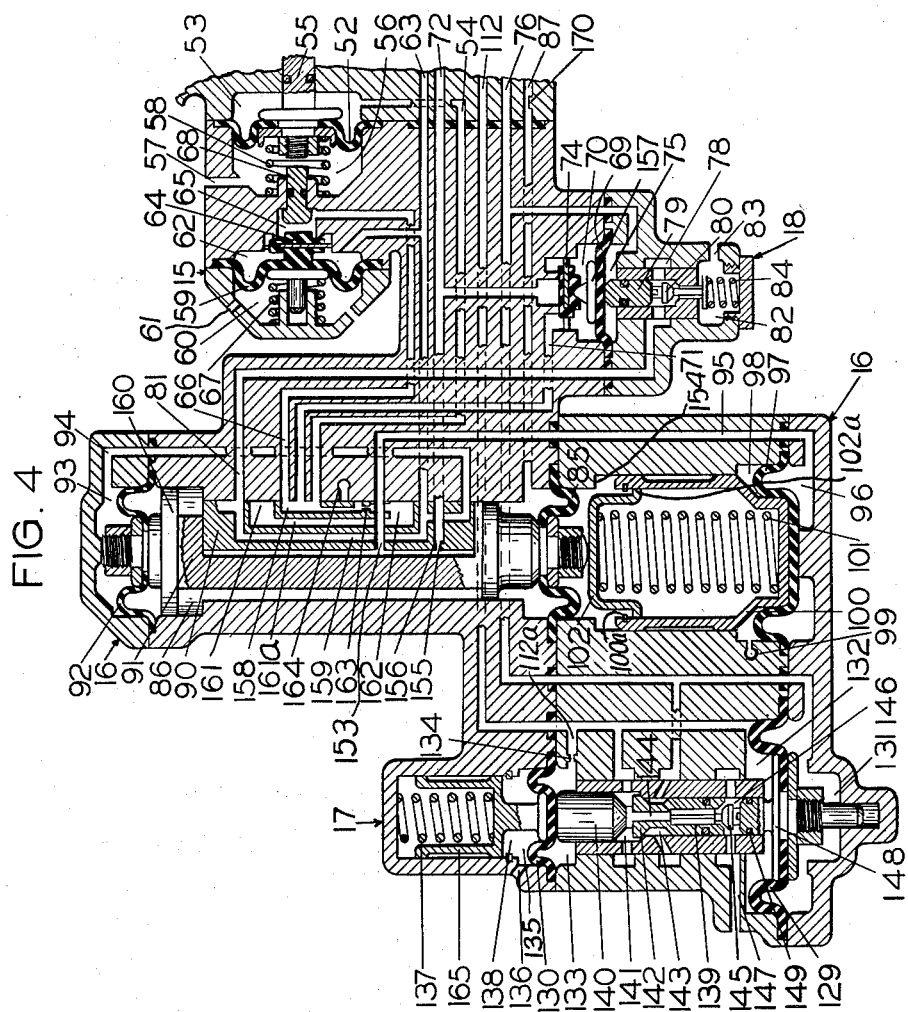

Other objects and advantages will become apparent in the following more detailed description of the invention taken in connection with the accompanying drawings wherein Fig. 1 is a diagrammatic view, partly in section, of a variable load brake equipment embodying the invention; Fig. 2 is a diagrammatic view, chiefly in section, of a portion of the equipment shown in Fig. 1; Fig. 3 is an enlarged sectional view taken on the line 3—3 through a portion of the apparatus shown in Fig. 2; and Fig. 4 is an enlarged diagrammatic view of a portion of the apparatus shown in Fig. 2.

As shown in Fig. 1 of the drawings, the variable load fluid pressure brake equipment may comprise the usual brake pipe indicated by the reference numeral 1, a branch pipe 2, a brake controlling valve device 3, an auxiliary reservoir 4, an emergency reservoir 5, a supplementary reservoir 6, a load compensating, or variable load, valve mechanism 7, a brake cylinder device 8 which may be of the standard type, and a load compensating brake cylinder device 9.

The brake controlling valve device 3 may be of substantially the same construction and have the same operating characteristics as the "AB" valve device shown and fully described in the patent to Clyde C. Farmer, No. 2,031,213, issued February 18, 1936 and assigned to the assignee of the present invention, and in view of this it is deemed unnecessary to show and describe this device in detail. It will, of course, be understood that this device operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a release of the brakes and the charging of the brake equipment.

It is preferred for this invention that the load compensating valve mechanism 7 be mounted by any suitable means to a sprung portion of a car, such as the under side 9a of the car body, so that the deflection of the truck springs resulting from a change in the weight of the lading on a car equipped with an apparatus embodying the invention may be measured and the mechanism conditioned according to this deflection. For this purpose, the load compensating valve mechanism 7 is provided with a measuring element 10 which may be actuated downwardly into engagement with a vertically fixed part, such as the truck axle 11, as shown in Figs. 2 and 3.

Referring now to Fig. 2, the load compensating valve mechanism 7, the operation of which is determined by the degree of movement of the measuring element 10 into engagement with the axle 11, may comprise a load measuring portion 12, a fulcrum positioning portion 13, a relay valve mechanism 14, a locking portion 15, a cut-off valve portion 16, a pilot valve portion 17 and a lock-out valve portion 18.

The load measuring portion 12 is provided for the purpose of actuating the measuring element 10 into engagement with a vertically fixed part of the truck and determining the operation of the fulcrum positioning portion 13 accordingly. For operatively carrying the measuring element 10 a stem 19 to which said element is rigidly attached, is slidably and rotatively mounted in a sleeve portion 19a of a casing 20 for the load compensating valve mechanism 7. Intermediate its ends the stem 19 is provided with a collar 21 which is keyed in a slot 22 formed in the stem so that the collar may effect the rotation of the stem and also permit the stem to slide in the casing. Interposed between the collar 21 and a spring seat 23 at the upper end of the stem 19 is a return spring 24 which constantly urges the stem toward its uppermost, or retracted, position in which it is shown in the drawings. An arm 25 is rockably and adjustably mounted to the casing 20 for engaging at one end the upper end of the stem 19 and actuating it downwardly against the force of the spring 24.

For actuating the arm 25 there is operatively mounted in a portion of the casing 20 a piston 26 having at one side a chamber 27 which is in constant open communication with a chamber 28 in the fulcrum positioning portion 13 by way of a passage 29. At the other side of the piston 26 is a chamber 30 which is constantly open to atmosphere by way of a passage 31, a chamber 32 and an atmospheric passage 33 in the casing 20. A spring 34 is disposed in the chamber 30 so as to engage a wall of the chamber and the piston 26 and urge said piston downwardly toward the position in which it is shown. The piston 26 is provided with a stem 35, which stem extends through the chamber 30 and its upper wall in the casing 20 into chamber 32 where the upper end of the stem may operatively engage the arm 25. For the purpose of preventing rotation of the stem 35, the right-hand side of the stem, as viewed in Fig. 2 is keyed in the casing 20. The stem 35 is further provided at its left-hand side with a tortuous slot 37 for receiving a portion of a member 38 which member is rotatably mounted in the chamber 32 and upon the stem 35 so that, when the piston 26 actuates the stem upwardly, the member is caused, during the intial piston movement of the piston, to rotate in a counter-clockwise direction as viewed in Fig. 3. An arm 39 on the member 38 is operatively connected by means of a link 40 to an arm 41 provided on the collar 21 for imparting rotary movement to the stem 19 and element 10 for reasons which will hereinafter more fully appear.

The fulcrum positioning portion 13 is provided for the purpose of positioning a fulcrum along a scale beam according to the distance the measuring element 10 is actuated by the load measuring portion 12. To effect this result, the fulcrum positioning portion 13 may comprise a portion of the casing 20 in which is slidably mounted a piston member 42, which member comprises a piston 43 and a piston 44 formed integrally therewith. The chamber 28 is located between these pistons 43 and 44, the piston 43 having at its opposite side the chamber 32 and the piston 44 having at its opposite side a chamber 45, which chamber 45 is in constant open communication with the load measuring portion 12 by way of a passage 46. Rigidly attached to the piston member 42 and extending into the chamber 32 is a fulcrum positioning bar 47 having formed at one side thereof a V-shaped projection which may serve as a fulcrum 48 for a composite scale beam lever 49 hereinafter described. The upper end of the bar 47 is operatively connected to one end of a lever 50 rockably mounted on the casing 20 in such a manner that the other end of the lever 50 may be actuated into engagement with the stem 35. The bar 47 is further provided, at a point intermediate its ends, with a toothed portion 51 for operative engagement with the locking portion 15 now to be described.

The locking portion 15 is provided for the purpose of locking the bar 47 and thereby the fulcrum 48 in its last assumed, load-adjusted position. As will now be seen, upon movement to its unlocked position the locking portion 15 also operates to permit fluid under pressure to flow from the cut-off valve portion 16 to the fulcrum positioning portion 13 and the load measuring portion 12 to render the same operative. The locking portion 15 comprises a casing section which has clamped therein at its periphery a flexible diaphragm 52, providing thereby, at one side, a chamber 53 which is in constant open communication with the cut-off valve portion 16 by way of a passage 54. A follower and stem 55 secured to the diaphragm 52 extends through the chamber 53 and a suitable opening in the casing 20 into the chamber 32 and terminates therein in a toothed end for locking engagement with the correspondingly toothed portion 51 of the bar 47. At the other side of the diaphragm 52 is a chamber 56 which is open to atmosphere by way of a passage 57. A spring 58 is operatively mounted in the chamber 56 so as to urge the follower and stem 55 toward locking engagement with the bar 47.

The locking portion 15 further comprises another diaphragm 59 which is clamped at its periphery between two portions of the casing 20 and has at one side a chamber 60 which is constantly open to atmosphere by way of a passage 61. At the other side of the diaphragm 59 is a chamber 62 which is connected to the cut-off valve portion 16 and the fulcrum positioning portion 13 by way of a passage 63. Operatively mounted in the chamber 62 is a valve 64, preferably formed of rubber and integral with diaphragm 59, for controlling communication between the chamber 62 and the cut-off valve portion 16 by way of a bore 65 and a passage 66 formed in the casing 20. A spring 67 is operatively mounted in the chamber 60 so as to act through the medium of the diaphragm 59 to urge valve 64 toward its seated position. A thrust member 68 is slidably mounted in the bore 65 so that it may be operated by the follower 55 to unseat the valve 64.

The lock-out valve portion 18 is provided for the purpose of preventing the load adjusting operation until the pressure of fluid in the brake cylinder device 8 has been reduced to some predetermined low degree such as ten pounds. The device 18 may comprise a diaphragm 69 tightly clamped at its periphery between two parts of the casing 20. At one side of the diaphragm 69 is a chamber 70 which chamber is in open communication with the cut-off valve device 16 by way of a passage 71 and may be connected by way of a passage 72 to a reset or timing reservoir 73 formed in a portion of the casing 20. Contained in the chamber 70 and controlling communication between said chamber and the passage 72 is a valve 74, which valve is operatively connected to the diaphragm 69. At the other side of the diaphragm 69 is a chamber 75 which is in open communication with the pilot valve portion 17 by way of a passage 76 and with the brake cylinder device 8 by way of passage 76 and a pipe 77. Chamber 75 is also connected to a valve chamber 78 by way of a bore having slidably mounted therein so as to seal said bore a follower 79 which effects a seal between the chambers 75 and 78 and effects a positive connection between the diaphragm 69 and a valve 80 contained in the chamber 78. The chamber 78 is also in constant open communication with the cut-off valve portion 16 by way of a passage 81 and may be connected to atmosphere by way of a fluted stem of the valve 80, a chamber 82 and a passage 83. Operatively arranged in the chamber 82 is a spring 84 which, through the medium of the valve 80, follower 79 and diaphragm 69, constantly urges the valve 74 toward its seated position, in which position it is shown in the drawing.

The cut-off valve portion 16 is provided for the purpose of permitting fluid under pressure supplied from the brake pipe 1 to flow to the various portions of the variable load valve mechanism 8 to effect its operation when the pressure is below a certain degree, to cut off the flow when the pressure rises above said certain degree, and to reestablish the flow when the pressure falls below another degree of pressure which is lower than the first mentioned certain degree. The cut-off valve portion 16 comprises a portion of the casing 20 having mounted therein a flexible diaphragm 85 rigidly clamped around its periphery between two connected parts of the casing 20, and having at one side a valve chamber 86 which is in constant open communication by way of a connected passage and pipe 87 with a brake pipe passage 88 provided in the brake controlling valve device 3, the passage 87 in the brake controlling valve device having a choke 89 inserted therein. Slidably mounted in the chamber 86 is a slide valve 90 which is arranged to be operated by a notched stem or follower 91 operatively secured at one end to the flexible diaphragm 85 and at the other end to a similar flexible diaphragm 92. The diaphragm 92 together with a wall of the casing 20 serves to define a chamber 93 which is in constant open communication with the seat of slide valve 90 by way of a passage 94. As shown in Figs. 2 and 4, the slide valve 90 controls communication by way of a passage 95 between the chamber 86 and a diaphragm chamber 96, which is defined by a wall of the casing 20 and a flexible diaphragm 97.

Defined by the diaphragms 97 and 85 and a wall of the casing 20 is a chamber 98, which chamber is constantly open to atmosphere by way of a passage 99. Contained in the chamber 98 and abutting the diaphragm 97 is a follower 100 which also serves as a seat for a spring 101. A follower 102 operatively engages the diaphragm 85 and is slidably carried at one end within the follower 100 so as to form a cage for the spring 101. As shown in Fig. 4 of the drawings, a retainer ring 100a mounted in the follower 100 may be engaged by an outwardly extending rim 102a of the follower 102 to prevent separation of the thus assembled spring cage and also enables the predetermination of one value of the spring 101 as will appear more fully later.

The relay valve mechanism 14 which may be operative during a brake application, may comprise a diaphragm 104 clamped about its periphery between two portions of the casing 20. At one side of the diaphragm 104 is a chamber 105 which is always open to atmosphere by way of an opening 106, chamber 32 and passage 33. Contained in this chamber 105 and operatively engaged by the diaphragm 104 is a follower and stem 107 which extends through the opening 106 into chamber 32 where it engages the outer end of an arm 108. The other end of the arm 108 makes a pivotal connection by means of a pin 109 with one end of an arm 110 which is pivotally mounted to the casing 20 at its other end on a pin 110a. The arms 108 and 110 together (Fig. 2) constitute the scale beam lever 49. At the other side of the diaphragm 104 is a chamber 111 which chamber is connected to the brake cylinder device 8 by way of a passage 112, pilot valve portion 17, passage 76 and pipe 77, the specific connection through the pilot valve portion being later described.

The relay valve mechanism 14 may further comprise another diaphragm 113 similar to diaphragm 104, and similarly mounted, in laterally spaced relation to said diaphragm 104. At one side of the diaphragm 113 is a chamber 114 which is always open to atmosphere by way of an opening 115, chamber 32 and passage 33. Contained in this chamber 114 and operatively engaged by the diaphragm 113 is a follower and stem 116 which extends through the opening 115 into the chamber 32 where it engages the arm 110 of the scale beam 49 at a point intermediate its ends. The end of the follower 116 adjacent the diaphragm is hollow and radially perforate so that, when assembled with a valve seat member 117 which has a through bore and is slidably mounted in a chamber 118 at the other side of the diaphragm 113, a passage 119 is formed for establishing communication between the chamber 118 and the chamber 114. Chamber 118 is also in constant open communication with the supplementary or load compensating brake cylinder device 9 by way of a passage and pipe 120. A release valve 121 is mounted in the passage 119 for controlling communication between the chamber 118 and the chamber 114. Located to the left from the left-hand surface of the release valve 121 and preferably formed integral therewith is a forked portion 122, which is spaced axially away from and extends toward the axis of the valve, the space between the forked portion and the top of the valve 121 being provided for the accommodation of an extension of a supply valve 123 operatively mounted in a chamber 124 in the casing 20, for controlling communication between the chamber 118 and the chamber 124. The chamber 124 is in constant open communication with the supplementary, or load, reservoir 6 by way of a passage 125, a check valve chamber 126 and a passage and pipe 127. Contained in the chamber 124 is a spring 128 which constantly urges valve 123 toward its seated position in which it is shown.

The pilot valve portion 17 is provided for the purpose of controlling the flow to the relay valve mechanism 14 of fluid under pressure being supplied to the brake cylinder device 8 so that at the initial charging pressures the differential between the supply to and delivery from the pilot valve portion 17 is approximately 8 pounds which is gradually reduced as the pressure of the fluid supplied increases until at 50 pounds pressure there is substantially no differential. The pilot valve portion 17 may comprise two spaced and axially aligned diaphragms 129 and 130 which are securely clamped at their outer peripheries between two connected parts of the casing 20. At the outer side of the larger diaphragm 129 is a chamber 131 which is in constant open communication with the lock-out valve portion 18 by way of a passage 76 and with the brake cylinder device 8 by way of the passage 76 and pipe 77. At the inner side of the diaphragm 129 is a chamber 132 which is in constant open communication with the chamber 111 in the relay valve portion 14 by way of a passage 112 and with a chamber 133 at the inner side of the diaphragm 130 by way of a choke 134 inserted in a branch 112a from passage 112. At the outer side of the diaphragm 130 is a chamber 135 which chamber is constantly open to atmosphere by way of a passage 136. Contained in the chamber 135 is a spring 137 which acts through the medium of a follower 138 to exert a constant downward pressure on the diaphragm 130.

Extending from the chamber 133 to the chamber 132 in axial alignment with the diaphragms 129 and 130 is a bore 139, which bore has operably mounted therein a combined diaphragm follower and plunger 140. This plunger 140 engages the diaphragm 130 and is slidably mounted in the upper end of the bore 139 so as to close communication by way of the bore between the chamber 133 and a chamber 141 in the bore at the lower end of the plunger, which chamber 141 is constantly open to passage 112 and thereby to chambers 132 and 133 at the inner sides of the respective diaphragms 129 and 130.

Contained in the chamber 141 and operatively mounted in the bore 139 is a valve member 142 which controls communication between the chamber 141 and a chamber 143 defined by the periphery of a reduced portion of the valve member and the bore 139 and constantly connected to chamber 131 by way of the passage 76. The valve member 142 is provided with a through axial bore 144 which is connected by means of a cross channel at its upper end to the chamber 141. The lower end of the bore 144 is provided with a valve seat for operative engagement with a valve 145 which is slidably mounted in the bore 144 and controls communication between said bore and a chamber 146 which chamber is in constant open communication with the atmosphere by way of a passage 147. For operating the valve 145 and the member 142, there is attached to the diaphragm 129 a follower member 148 which is slidably guided in the bore 139 with which it effects a sealing engagement by means of a sealing ring 149. The follower member 148 thus closes communication between the chamber 146 and the chamber 141 by way of the bore 139.

OPERATION

Initial charging of the equipment

Assuming the vehicle embodying this invention to be empty and separated from a train, brakes on the vehicle to be released, the brake pipe 1 to be depleted of fluid under pressure and the fulcrum 43 to be temporarily disposed in the empty position in which it is shown, the brake controlling valve device 3 will be in brake applied position and the several other parts will be in the positions in which they are shown.

Now if the empty vehicle is placed in a train, the brake pipe 1 will, of course, be connected at each end of the vehicle to the corresponding brake pipe at the adjacent end of each adjacent vehicle in the train and as a result will be charged with fluid under pressure in the usual manner. Fluid under pressure thus supplied to the brake pipe 1 flows through the branch pipe 2 to the chambers at the faces of the service and emergency pistons of the brake controlling valve device 3, moving them in due course to release and charging positions. Fluid under pressure will then flow to the several chambers of the brake controlling valve device 3, and thence in the usual manner to the auxiliary reservoir 4 by way of a pipe 150 and to the emergency reservoir 5 by way of a pipe 151.

At the same time fluid under pressure in the brake pipe 1 will also flow to the supplementary reservoir 6 by way of the branch pipe 2, passage 88 and choke 89 in the brake controlling valve device 3, connected pipe and passage 87, past the spring loaded check valves 152 into chamber 126 in the variable load valve mechanism 7 and thence by way of a pipe and passage 127 to the reservoir.

Fluid under pressure thus supplied to the passage 87 will also flow to the slide valve chamber 86 in the cut-off valve portion 16, and the inner surfaces of the diaphragms 85 and 92 will both be subject to the pressure fluid thus supplied. Since the diaphragms have equal and oppositely effective areas and they are positively connected by means of the follower and stem 91, the fluid pressure in chamber 86 will be ineffective to cause the slide valve 90 to be moved out of the position in which it is shown in Figs. 2 and 4. With the slide valve 90 in the position in which it is shown, fluid under pressure in chamber 86 may flow by way of a port 153 in the slide valve 90 and the passage 95 in the casing 20 to the chamber 96 to act over the relatively larger area of the diaphragm 97. Upon an increase in the pressure of fluid in the chamber 96 to a degree sufficient to overcome the opposing pressure of the spring 101, the diaphragm 97 will act in response to this fluid pressure to move the follower 100 upwardly against the pressure of the spring until the follower engages a shoulder 154 formed in the wall of the chamber 98. With the follower 102 abutting the follower 91 and the latter being in its uppermost position, the spring 101 will be compressed, thereby increasing the value of the spring to a certain predetermined degree for a purpose which will hereinafter more fully appear.

Fluid under pressure supplied to the chamber 86 may also flow by way of a choke 155 and a port 156 in the slide valve 90 and then by way of the passage 72 to the reset reservoir 73, and also by way of the passage 72 to the seated side of the check valve 74 in the lock-out valve portion 18. It will be understood that during initial charging the brakes will be released and therefore there will be no fluid pressure in the brake cylinder device 8 or the chamber 75 in communication therewith. Consequently, the diaphragm 69 (Fig. 4) will be inoperative and the bias spring 84 alone will be effective, through the medium of the valve 80, follower 79, diaphragm 69 and a follower 157, in holding the valve 74 in its closed position in which it is shown. In response to an increase in the pressure of fluid in the passages 72 to a certain degree, the valve 74 will be actuated downwardly out of its seated position against the force of the spring 84 acting through the just mentioned medium, thereby permitting fluid under pressure to flow from the passage 72 into the chamber 70. The pressure of fluid in the chamber 70 acting over the area of the diaphragm 69, which area is considerably larger than that of the valve 74, will be more effective in causing the diaphragm to deflect downwardly. The diaphragm 69 will therefore continue to deflect downwardly until the valve 80 is actuated to its closed, or seated position, in which position communication of passage 81 to atmosphere will be closed. Fluid under pressure supplied to chamber 70 will flow by way of the passage 71 to a cavity 158 in the slide valve 90, whence it may flow by way of a passage 66 to the supply chamber 65 in the locking portion 15 and by way of a passage 54 to the control chamber 53 in the locking portion.

Since the chamber 56 at one side of the diaphragm 52 is at atmospheric pressure, the fluid pressure in chamber 53 acting on the opposite side of the diaphragm will be opposed only by the force of the spring 58. When the pressure of fluid in chamber 53 reaches a predetermined degree, the diaphragm 52 will deflect to the left against the pressure of the spring 58 and cause the follower and stem 55 to be actuated out of locking engagement with the toothed portion 51 of the fulcrum positioning bar 47. By this same movement the follower 55 engages the thrust member 68 and actuates said member into operative engagement with the valve 64. A further increase in the fluid pressure in the chamber 53 will cause the diaphragm 52 to deflect further to the left and, through the medium of the follower 55 and thrust member 68, actuate the valve 64 to the left against the additional pressure of the spring 67 to an unseated position. Fluid under pressure in chamber 65 will flow past the valve 64 into the chamber 62 where it will act over the relatively large area of the diaphragm 59, thereby increasing the pressure opposing the spring 67 and moving the valve 64 to a fully opened position.

Fluid under pressure supplied to the chamber 62 (Fig. 2) may now flow by way of the passage 63 to the chamber 28 in the fulcrum positioning portion 13 and by way of passages 63 and 29 to the chamber 27 in the load measuring portion 12. Since chamber 45 at the lower side of the piston 44 is at atmospheric pressure, fluid pressure in chamber 28 will tend to move the piston 45 toward its lowermost position in which position it is shown in Fig. 2.

When the force exerted in an upwardly direction on the piston 26 in the load measuring portion 12 by the pressure of fluid in chamber 27 is sufficient to overcome the opposing force of the spring 34, the piston will be caused to move in an upward direction as viewed in Fig. 2 while the key 36 prevents the piston stem 35 from rotating. As the stem 35 moves upwardly the tortuous slot 37 therein traverses a key portion of the rotatable member 38, causing the member during the initial part of this piston movement to rotate through an angle of ninety degrees in a counter-clockwise direction, as viewed in Fig. 3. This rotative movement of the member 38 is transmitted to the measuring element 10 through the medium of the arm 39 of the member, the link 40 and the arm 41 of the collar 21, the member 41 being keyed in a straight slot 22 of the stem 19 to which the measuring element 10 is rigidly attached. Continued upward movement of the piston 26 causes the upper end of the stem 35 to engage the left-hand end of the arm 25 and cause the arm to rock about its mounting pin in a clockwise direction as viewed in Fig. 2. Since the right-hand end of the arm 25 will come into operative engagement with the upper end of the stem 19, this movement will cause the stem 19 to move in a downward direction, carrying the measuring element 10 with it. Thus, it will be seen that upward movement of the piston 26 causes the measuring element 10 to swing from the position in which it is shown to a position over the axle 11 and then to move downwardly until a horizontal surface 10a thereof engages the axle. Assuming that the vehicle is empty, the measuring element 10 and consequently the piston 26 will be actuated the full limit of their travel as defined by the engagement of the upper end of piston 26 with the upper end wall of chamber 30.

Now as the piston 26 proceeded in its upward movement it passed the mouth of the passage 46 and thus connected the chamber 27 of the load measuring portion 12 to chamber 45 in the fulcrum positioning portion 13. Fluid under pressure which was being supplied to chamber 27 then flowed by way of passage 46 to the chamber 45 and subjected the lower surface of the piston 44 of the piston member 42 to substantially the same degree of fluid pressure as that in chamber 28 acting upon the opposite side of the piston 44. The fulcrum positioning bar 47 having been previously unlocked, and the opposing forces acting on the piston 44 now being in balance, the connected piston 43 acts in response to the pressure of fluid in the chamber 28 to move the bar 47 upwardly until the piston 44 engages the upper end surface of chamber 28. In this position of the bar 47 the fulcrum 48 will be in position for braking a fully loaded vehicle. However, in the presently assumed empty condition of the vehicle, the stem 35 will be permitted to move to its uppermost position in which it is shown in dot and dash lines in Fig. 2 and by reason of piston 26 being of larger area than piston 43 will effect counter-clockwise rocking of the lever 59, and consequent downward movement of the bar 47 and piston 42, until the parts assume the position in which they are shown in Fig. 2.

It will be noted that, if the measuring element 19 should be frozen, or otherwise unable to move, the piston 42 will continue to be biased toward empty position because the passage 46 will not connect with chamber 27. Thus, the possibility of overbraking an empty car will be eliminated.

Referring again to the cut-off valve portion 16 in Fig. 4, it will be noted that fluid under pressure supplied to the passage 63 from the chamber 62 in the locking portion 15 may also flow to a cavity 159 in the slide valve 90. Although this cavity 159 is connected by way of the passage 81 to the chamber 78 in the lock-out valve portion 18, there will not be any substantial flow through the passage 81 because the connection of chamber 78 to atmosphere is closed by the valve 80 as hereinbefore described. Fluid under pressure in cavity 159 will flow by way of the passage 94 to the chamber 93 where it will exert a downwardly directed force on the diaphragm 92.

Now when the pressure of fluid in the valve chamber 86 and consequently in the chamber 93 has been increased to approximately 45 pounds, the diaphragms 85 and 92 will be caused to deflect downwardly against the opposing pressure of the spring 101. The diaphragms, as they thus deflect, act through the medium of the connected stem 91 to shift the slide valve 90 in the same direction. When the deflection of the diaphragms 85 and 92 is brought to a stop by reason of an extension 160 formed integral with the stem 91 engaging an interior surface of the casing 20, the slide valve 90 will have been moved downwardly to its lowermost, or cut-off position (not shown).

With the slide valve 90 in its lowermost position, passage 81 will be blanked off, and passages 66 and 71 will be connected together by way of a cavity 161 in the slide valve, which cavity is in restricted communication with the atmosphere by way of a relatively narrow passage 161a, a cavity 162, a choke 163 and the cavity 158 in the slide valve and an atmospheric passage 164 in the slide valve seat. Since, under the assumed condition of there being no brake cylinder pressure present, the valve 74 in the lock-out valve portion 18 is unseated, fluid pressure in the reset or timing reservoir 73 will equalize with that in chamber 65 by way of passage 72, past valve 74, chamber 70, passage 71, cavity 160 and passage 66, and also slowly vent to atmosphere by way of cavity 160, passage 161, cavity 162, choke 163, cavity 158 and the atmospheric passage 164.

Although the fluid pressure in the reset reservoir 73 may equalize with that in passage 63 by way of the above described route to chamber 65, past valve 64 to chamber 62, and thence to passage 63, the cavity 158 serves to effect a direct connection between the reservoir and the passage 63, which connection thus by-passes valves 64 and 74 in the locking portion 15 and the lock-out valve portion 18, respectively. As previously described, cavity 162 is connected to atmosphere by way of the choke 163, cavity 158 and passage 164.

With the slide valve 90 in its lowermost position, cavity 158 is not only in registration with atmospheric passage 164 but also with passage 95, whereby the pressure of fluid in chamber 96 is vented to atmosphere. Upon reduction of fluid pressure in chamber 96 to atmosphere, the spring 101 will expand and act through the medium of the follower 100 to move the diaphragm 97 downwardly toward its lowermost position in which it is shown, thereby reducing the force exerted upwardly by the spring 101. In cut-off position, port 156 registers with passage 94 so that chamber 86 may communicate by way of choke 155, cavity 156 and passage 94 with chamber 93 at the upper side of diaphragm 92 and thereby equalize the fluid pressure acting on the diaphragm 92. The pressure of fluid in chamber 86 acting in a downward direction on diaphragm 85 will be sufficient to hold the follower 91 in its lowermost position until some predetermined low degree of pressure such as 25 pounds is present in the brake pipe.

Attention is here directed to the fact that, by reason of the novel spring and port control arrangement employed in the cut-off valve portion 16, said portion will operate to its cut-off position when the brake pipe pressure is increased up to 45 pounds, and will operate to its cut-in position when the brake pipe pressure is reduced down to 25 pounds. Thus it will be seen that protection against undesired operation of the mechanism 12 upon an overreduction in brake pipe pressure at a service rate is well assured, and operation of the mechanism upon increasing the brake pipe pressure from atmospheric pressure made more nearly positive.

With the slide valve 90 in its lowermost position, cavity 158 will also be in registration with passage 54. Fluid under pressure in chamber 53 will flow to atmosphere by way of passage 54, cavity 158 and passage 164. When the pressure of fluid in chamber 53 acting on diaphragm 52 is reduced below the opposing pressure of the spring 58, the spring will cause the follower 55 to move toward the right until the toothed end locks with the toothed portion 51 of the fulcrum positioning bar 47. Since the volume of chamber 53 and passage 54 is much smaller than the total volume of the reset reservoir, passage 63 and the ports with which it is connected, and since the latter volume is connected to atmosphere by way of the choke 163 in the slide valve, it will be apparent that the locking operation will precede the return of the load measuring mechanism 12.

With the passage 63 connected to atmosphere, fluid under pressure in the chamber 62 will flow to atmosphere by way of the passage 63, cavity 162, choke 163, cavity 158 and passage 164. When the pressure of fluid in chamber 62 acting on the diaphragm 59 is reduced below the opposing force of the spring 67, the spring will cause the diaphragm to deflect to the right and carry the valve 64 toward its seated position.

With the passage 63 connected to atmosphere, fluid under pressure in chamber 27 will also flow to atmosphere by way of passages 29 and 63, the cavity 162, the choke 163, cavity 158 and the atmospheric passage 164. Fluid under pressure in chamber 45 will at this time flow to atmosphere by way of passage 46, chamber 27, passage 29 to passage 63 and the same route. Fluid under pressure in chamber 28 will also flow to atmosphere by way of the connected passage 63 and the same route. Upon the reduction of the pressure of fluid in chamber 27 below the opposing pressure of the spring 34 the spring will act to move the piston 26 downwardly toward the position in which it is shown in Fig. 2. As the piston 26 moves downwardly away from the left-hand end of the lever 25 the pressure of spring 24 thus released will cause the measuring element 10 to first move upwardly above the axle 11 and then to rotate approximately 90° in a clockwise direction to the position in which it is shown in Figs. 2 and 3. The fulcrum positioning bar 47 having just previously been locked by the stem 55 will remain in the position in which it is shown. Chamber 45 will now be open to atmosphere by way of passage 46, chamber 30, passage 31, chamber 32 and passage 33.

The reset or timing reservoir 73 will be slowly vented to atmosphere by way of passage 72, cavity 162, choke 163, cavity 158 and passage 164. As previously noted, by reason of the choke 163 this reservoir is not reduced to atmospheric pressure until after the locking portion 15 has locked the bar 47. The pressure in this reservoir 73 therefore will equalize with the piston chambers 28, 45 and 27 and thus hold the pistons 44 and 27 in their load adjusting positions until after the portion 15 has locked the bar 47.

*Application of the brakes on an empty vehicle*

When it is desired to effect an application of the brakes, the brake pipe pressure is reduced in the usual manner, causing the brake controlling valve device 3 to function to supply fluid under pressure from the auxiliary reservoir 4 to the brake cylinder device 8 in order to advance the usual brake shoes, not shown, into frictional engagement with the vehicle wheels. The flow of fluid under pressure from the auxiliary reservoir 4 to the brake cylinder device 8 is by way of the pipe 150, through the controlling valve device 3 and the brake cylinder pipe 77. At the same time fluid under pressure flows by way of the pipe 77 and passage 76 to the chambers 131 and 143 in the pilot valve portion 17.

Upon a slight increase in the pressure of fluid in the chamber 131 the diaphragm 129 will be caused to flex upwardly, acting through the medium of the follower 148 to move the valve 145 to a seated position on the lower end of the valve member 142, in which position communication between the chamber 143 and the atmosphere by way of the bore 144 in the valve member 142, past the fluted stem of the valve 145 and through the passage 147 is cut off.

Upon the further increase in the pressure of fluid in chamber 131, which pressure is the same as that supplied to the brake cylinder device 8, the diaphragm 129 will be deflected upwardly against the opposing pressure of the spring 137 acting through the medium of a spring seat and follower 165. This additional upward movement of the diaphragm 129 will cause the valve 142 to move out of its seated position so that fluid under pressure supplied from the brake controlling valve device 3 to chamber 143 as previously noted may now flow past the valve 142 into chamber 141, and thence by way of passage 112 to chamber 111 in the relay valve portion 14. Fluid under pressure in chamber 141 may also flow by way of passage 112 to the chamber 132 at the upper side of the diaphragm 129, and by way of passage 112, choke 134 to chamber 133 at the lower side of the diaphragm 130.

The supplying of fluid under pressure to the chamber 132 causes the power of the diaphragm 129 exerted against the force of the spring 137 to diminish and to continue to diminish as the fluid in chamber 132 increases, up to a certain degree to be explained later. The pressure of fluid in chamber 133 acts on the diaphragm 130 to decrease the effective force transmitted from the spring 137 to the valve 142, but it will be understood that this spring force will still be sufficient to move the valve 142 to its seated position and cut off the further flow of fluid from chamber 143 to chamber 141 when the pressure in chamber 132 has reached a predetermined degree in relation to the pressure in the chamber 131. The choke 134 in that part of the passage 112 leading to the chamber 133 serves to delay the building up of fluid pressure in chamber 133 until the fluid pressure acting upwardly on the larger diaphragm 129 is counterbalanced by the fluid pressure in chamber 132 acting downwardly on the diaphragm 129. Thus, possible overshooting of the pressure desired in passage 112 and chamber 132 by unseating the valve 142 too suddenly or too far may be avoided. It is preferred that the relation of the diaphragm areas and the spring force be such that at approximately 50 pounds pressure in chamber 131 (equalization point between the brake cylinder and auxiliary reservoir pressure) the diaphragm 129 will be ineffective and in response to this pressure, the diaphragm 130 will be effective to maintain the combined spring seat and follower 165 in its uppermost position. Thus an initial 8 pound difference in the pressure of fluid in chamber 131 over that in chamber 132 is decreased in proportion to the degree of increase in the brake application until at a full service application (50 pounds brake cylinder pressure) the pressures in these chambers are equal.

With the vehicle empty, the fulcrum 48 will be in the position in which it is shown in Fig. 3, in which position the diaphragm 104 will be prevented by the fulcrum 48 from moving the follower and stem 107 to the right in response to the pressure of fluid in the chamber 111, and consequently valves 121 and 123 will remain in the positions in which they are shown. The mechanism 7 being inoperative to cause the load compensating brake cylinder device 9 to operate, the brake cylinder device 8 only will exert the braking force.

*Release of the brakes with the equipment conditioned for empty car operation*

When it is desired to effect a release of the brakes, the brake pipe pressure is increased in the usual manner causing the brake controlling valve device 3 to function to establish communication from the brake cylinder device 8 to atmosphere by way of a retaining valve device 166. Fluid under pressure now flows by way of pipe 77 from the brake cylinder device 8 to the brake controlling valve device 3, and from there by way of a pipe 167 to the retaining valve device 166 which connects pipe 167 directly to atmosphere when a handle 168 on the device 166 is in the position in which it is shown. Brake cylinder device 8 now responds to the release of fluid under pressure therefrom in the usual manner to effect a release of the vehicle brakes. Upon the release of fluid under pressure from the pipe 77 fluid under pressure will also be released from the chamber 131 of the pilot valve portion 17 by way of passage 76, pipe 77, brake controlling valve device 3, pipe 167 and the retaining valve device 166 to atmosphere.

Upon the release of fluid from the chamber 131, the diaphragm 129 will be moved to the position in which it is shown in the drawing by the pressure of the fluid in the chamber 132. Fluid under pressure in chamber 141 and bore 144 will cause the valve 145 to unseat and thereby permit fluid under pressure in chamber 141 to flow to atmosphere by way of the bore 144, the fluted stem of the valve 145, the chamber 146 and the passage 147. Fluid under pressure from the chamber 111 in the relay valve portion 14 will flow by way of passage 112 to the chamber 141 and thence to atmosphere in the manner just described.

*Automatic changeover of the equipment on a partially loaded vehicle*

Assuming now that the brakes on the vehicle are applied and that the vehicle is separated from the train and that while the brake pipe is at atmospheric pressure, lading is placed on the body of the vehicle. Under the influence of such additional weight, the vehicle body will move downwardly relative to the axle 11 by reason of the usual truck springs (not shown) yielding to the additional weight.

Now when the vehicle is connected in a train, the brake pipe starts to charge with fluid under pressure in the same manner as hereinbefore described in connection with the charging of an empty vehicle. As before described, fluid under pressure which is supplied to the brake pipe 1 flows to chamber 86 in the cut-off valve portion 16, whence it flows by way of passage 72 to the reset reservoir 73 and to the seated area of the valve 74. With the brakes applied, however, fluid under pressure from the brake cylinder pipe 77 will be present in chamber 75 and acting in an upward direction on the diaphragm 69. The value of the spring 84 and the relation between the opposing areas of the valve 74 and the diaphragm 69 will be such that the valve will be held seated until the brake cylinder pressure has been reduced to some predetermined low degree such as 10 pounds.

As previously noted, brake cylinder pressure in pipe 77 is also communicated by way of the pilot valve portion 17 to chamber 111 in the relay valve portion 15 where it acts upon the diaphragm 104 to exert a force upon the fulcrum 48. As will hereinafter appear, under partially or fully loaded conditions this action of the diaphragm 104 will cause the diaphragm 113 to also operate to exert an additional force on the fulcrum 48. Obviously it is not desirable to shift the fulcrum while under the stress of the forces exerted by diaphragm 111 alone, or by both diaphragms. The lock-out valve portion 18, therefore, prevents fluid under pressure being supplied to the fulcrum positioning portion 13, as hereinbefore described in connection with the initial charging of the equipment, from effecting its operation until after the stresses on the fulcrum have been substantially eliminated.

It will further be noted that, because of the operation of the lock-out valve portion 18, the reset reservoir 73 will continue to charge from the brake pipe until the brake cylinder pressure has been reduced to approximately 10 pounds. By the use of the reset reservoir 73 in combination with the lock-out valve portion 18, the load adjusting operation of the portions 12 and 13 is assured regardless of the rate of rise in brake pipe pressure, that is to say, regardless of the relative location of the car in the train. Let us suppose that an emergency application of the brakes had previously been made just prior to this brake release operation, and, that the vehicle equipped with this load compensating apparatus is located at or near the head end of the train. In effecting a release under these conditions, the brake pipe pressure at the head end will rise rapidly to its normal pressure. This rapid rise in pressure will not register however in the slide valve chamber 86 because of a choke 170 inserted in the passage 87.

When the valve 74 unseats, fluid under pressure in the passage 72 will flow to the supply chamber 65 in the locking portion 15 by way of chamber 70, passage 71, cavity 158 and passage 67. This fluid pressure will not by itself be sufficient to unseat the valve 64. Fluid under pressure in cavity 158 will also flow to chamber 53 in the locking portion 15 by way of passage 54. In response to the pressure of fluid in chamber 53, the diaphragm 52 will move to the left against the pressure of the spring 58, thereby causing the member 55 to move out of locking engagement with the fulcrum positioning bar 47. Thereafter, the diaphragm will act through the medium of the thrust member 68 to unseat the valve 64 and permit fluid under pressure supplied to chamber 65 to flow by way of passage 63 to chamber 28 in the fulcrum positioning portion 13.

The bar 47, having been previously unlocked, will be actuated downwardly by the piston 44 to its empty position, if not already there. Fluid under pressure in passage 63 will also flow by way of passage 29 to chamber 27 in the load measuring portion 12. The pressure of fluid in chamber 27 will effect the upward movement of the piston 26, which movement will cause the measuring element 10 to rotate into a position above the axle 11 and then to descend into engagement therewith. Upward movement of the piston 26 past the mouth of the passage 46 will connect chamber 27 to chamber 45 and equalize the pressures acting on piston 44. Fluid pressure in chamber 28 will cause the piston member 42 to actuate the bar 47 upwardly and by means of the bar 47 rock the lever 50 in a clockwise direction until the right-hand end of said lever engages the upper end of the stem 35. When the vehicle was empty, the piston 26 operated the lever 50 back to empty position. Now however, if the vehicle is partially loaded, the car body will have lowered as a result of the added weight of such load and the stem 35 will stop short of its full travel by reason of the measuring element 10 traveling a shorter distance to engage the axle 11. The bar 47 will be actuated downwardly only part of its full travel and consequently the fulcrum 48 will be located at some point intermediate the middle of the scale beam lever 49 and the position in which the fulcrum is shown.

When the brake pipe pressure is increased to the degree required to effect the operation of the cut-off valve portion 16, this portion will operate as described before to rapidly vent fluid under pressure from chamber 53 to atmosphere. With chamber 53 thus vented, the diaphragm 52 will respond to the force of the spring 58 to move the follower and stem 55 into engagement with the toothed portion 51 of the bar 47 to hold the bar and thereby the fulcrum 48 in their newly assumed positions.

Fluid under pressure in chambers 27, 28, 45, 62, 65 and 70 will be vented to atmosphere at a slower rate by reason of the choke 163 in the slide valve 90 restricting the communication. When fluid pressure in chamber 62 drops below that of the opposing spring 67, said spring will actuate the supply valve 64 to its seat in preparation for the next load adjusting operation. Reduction of fluid pressure in chamber 70 to atmosphere will permit the spring 84 to actuate the valve 74 to its seated position and will also permit unseating of the valve 80, thereby connecting passage 81 to atmosphere. This is of little consequence at this time since one end of passage 81 is blanked off by the slide valve 90. However, when the next emergency application of the brakes is made, any fluid pressure which might accidentally develop in passage 63 while the brakes are applied will be vented to atmosphere by way of cavity 159 in the slide valve 90, passage 81, chamber 80, and thence past valve 80 to chamber 82 and passage 83. Thus it will be noted that the valve 80 also serves as an additional means to prevent the operation of the load measuring portion 12 with the brakes applied.

With the chamber 27 of the load measuring portion 12 vented of fluid under pressure, the spring 34 acts to return the piston 26 and the piston stem 35 to the position in which they are shown. In so doing, it will cause the measuring element 10 to first rise vertically upward and then to rotate in a clockwise direction to the position in which it is shown in Fig. 3. When the piston 27 in its downward movement passes the mouth of the passage 46, chamber 45 is again connected to atmosphere by way of passage 46, chamber 30, passage 31, chamber 32 and passage 33.

With the position of the fulcrum 48 relative to the scale beam lever 49 of the load compensating valve mechanism 7 determined according to the amount of movement of the measuring element 10 transferred by the lever 50 to the fulcrum shifting bar 47, and the transfer of movement being determined according to the load on the vehicle, the equipment is now in condition for braking a partially loaded vehicle.

*Application of the brakes on a partially loaded vehicle*

When an application of the brakes is made on a partially loaded vehicle by effecting a reduction in brake pipe pressure, the operation of the brake controlling valve device 3 will be identical with the operation described for an empty vehicle. From this it will be understood that fluid under pressure will be supplied through pipe 77 to the brake cylinder device 8, from pipe 77 to chamber 131 in the pilot valve portion 16 by way of passage 76, and therefrom to chamber 111 in relay valve portion 15 by way of passage 112 in a manner previously described for the application of the brakes on an empty vehicle.

The pressure of fluid in chamber 111 tends to deflect the diaphragm 104 and the follower 107 to the right as viewed in Fig. 2 against the opposing pressure of a spring 166. It is preferred that this spring 166 be equivalent to a value of 5 pounds fluid pressure acting on the diaphragm 104. By reason of the fact that the pilot valve portion 17 creates at low pressures a difference of 8 pounds between the pressures in passages 76 and 112 as previously explained and the spring 166 holds back operation until 5 additional pounds pressure are present in the chamber 111, there is approximately 13 pounds pressure in the brake cylinder device 8 when the load compensating brake cylinder device 9 is at atmospheric pressure whereby slack take-up in the rigging before the brake cylinder device 9 operates is assured, and complete release of device 9 before slack in the rigging is let out is assured.

When the fluid pressure in chamber 111 is sufficient to overcome the pressure of spring 166, the stem and follower 107 will be caused to move to the right, thereby rocking the lever 108 in a counter-clockwise direction about the fulcrum 48, which is now located at some point intermediate the point in which it is shown and the middle of the composite scale beam lever 49. Rocking of the lever 108 in this direction will effect through the medium of the pin 109 the rocking of the lever 110 in a clockwise direction. As the lever 110 is thus rocking it causes the diaphragm 113 to deflect to the left and actuates the valve seat member 117 into sealing engagement with the release valve 121 and then through the medium of the forked portion 122 unseats the supply valve 123 against the opposing pressure of the spring 128. With the supply valve 123 unseated, fluid under pressure supplied from the supplementary reservoir 6, through pipe 127, chamber 126 and passage to the supply valve chamber 124 flows therefrom past the fluted stem of the valve 123, through chamber 118, and passage and pipe 120 to the load compensating brake cylinder device 9.

Now when the pressure of fluid in diaphragm chamber 118 acting on the diaphragm 113 becomes slightly greater than that required to balance the force of diaphragm 104 acting through the lever 49, diaphragm 113 will move to the right, permitting the supply valve 123 to seat. The valve 123 as it thus closes cuts off the further flow of fluid under pressure to the diaphragm chamber 118 and consequently to the brake cylinder device 9. With the flow of fluid to chamber 118 cut off, the flexure to the right of the diaphragm 113 comes to a stop before the release valve 121 is unseated.

When, in effecting an application of the brakes on a partially loaded vehicle, fluid under pressure is supplied to the brake cylinder device 9, said device functions to actuate a brake cylinder lever 169 to first bring the brake shoe elements (not shown) into frictional engagement with the wheels (not shown) and then to cause a push rod 170 of the brake cylinder device 9 to be moved outwardly relative to its associated piston rod and piston. As the piston and piston rod of the device 9 move out under the influence of the pressure of fluid supplied thereto, a latch mechanism 171 functions in the usual well known manner to latch the notch push rod 170, so that further movement of the piston of the brake cylinder device 9 now acts, through the medium of the latch mechanism and push rod, on the brake cylinder lever 169 to add the force of the load compensating brake cylinder device 9 to that of the brake cylinder device 8.

*Release of the brakes with the equipment conditioned for braking a partially loaded vehicle*

When it is desired to effect a release of the brakes on a partially loaded vehicle, the brake controlling valve device 3 will function in response to an increase in brake pipe pressure to vent fluid under pressure from the brake cylinder device 8 to atmosphere by way of the pipe 17, valve device 3, pipe 167 and an atmospheric passage in the retaining valve device 166 when the handle 167 is in the position shown and cause the brake cylinder device 8 to respond in the usual manner to effect a release of the brakes.

Since chamber 131 in the pilot valve portion 17 is connected to the pipe 77 by way of a passage 76, the resulting reduction in the pressure of fluid in chamber 131 will effect a reduction of fluid pressure in the chamber 111 in the relay valve portion 14 in the same manner and by the same route as previously described for the release of the brakes with the equipment conditioned for braking an empty vehicle. When the pressure of fluid in chamber 111 is reduced below that required to keep the scale beam lever in balance, the excess fluid pressure in chamber 118 will cause the diaphragm 113 together with follower and stem 116 to move to the right, thereby rocking the lever 110 in a counter-clockwise direction about the pin 110a, the lever 108 in a clockwise direction about the pin 109, and with the aid of the spring 166 causing the diaphragm 104 to deflect toward the left. In moving to the right the diaphragm 113 operates to unseat the release valve 121 through the medium of the follower and stem 116 and the valve seat member 119. With the valve 121 unseated, fluid under pressure is vented from the brake cylinder device 9 to the atmosphere by way of pipe and passage 120, chamber 118, past the fluted stem of the valve 121 to chamber 114, opening 115, chamber 32 and passage 33. When the pressure of fluid in chamber 118 has been reduced to slightly below that of the opposing force of the diaphragm 104 acting through the medium of the lever 49, the diaphragm 104 will cause the lever 108 to rock in a counter-clockwise direction and the lever 110 to rock in a clockwise direction, actuating the valve seat member 117 into engagement with the valve 121 and cutting off the further flow of fluid under pressure from the brake cylinder device 9 and chamber 118 to atmosphere.

It will be readily seen that as the load increases, the fulcrum 48 is shifted further up until it reaches a position at the middle of the lever 47, at which point the leverage ratio will be 1 to 1 and the fluid pressure in the load compensating brake cylinder device 9 plus the pressure of the spring 166, plus the differential in pressure established by the pilot valve portion 17 will equal the fluid pressure in the brake cylinder device 8.

*Summary*

Summarizing, it will be seen that by the use of this invention there is provided a variable load brake apparatus for railway vehicles, which is automatic and positive in operation, to vary the degree of braking of the vehicle in accordance with the empty or loaded condition thereof by varying the supply of fluid under pressure from a supplementary reservoir to a supplementary or load brake cylinder according to the position that the sprung vehicle body assumes under various loads relative to a vertically fixed part of a truck. This invention provides novel valve means whereby the adjusting operation according to load occurs each time the apparatus is charged after an emergency reduction in brake pipe is effected, regardless of the position of the vehicle in the train. This invention further provides a novel pilot valve device which provides a difference in pressures of the empty and load brake cylinders at the beginning of an application and the final period of a release of the brakes so that the load brake cylinder is last to apply and first to release in order to prevent possible damage to its latch mechanism. There is also provided a novel cut-off valve device which conditions the apparatus for an adjusting operation as the brake pipe pressure rises from below a predetermined low degree to a certain high degree and then terminates the adjusting operation. The cut-off valve device will not permit a re-set of the apparatus unless the brake pipe pressure is reduced below said predetermined low degree. This invention also provides, in a variable load brake of the type having an adjustable member and a mechanism for locking the member in its adjusted position, a fluid pressure responsive means biasing said member toward a position for braking an empty vehicle, which means is effective only during the adjusting period so that strain on the locking mechanism will be eliminated at all other times. This latter means by reason of its direction of bias prevents over-braking of an empty vehicle which might occur as a result of a failure of the adjusting mechanism on an empty vehicle to operate after having previously conditioned the brake equipment for braking a loaded vehicle.

Having now described my invention, what I claim as new and desire to secure by Letters Patent is:

1. The combination with a vehicle having a sprung part and an unsprung part, said sprung part being movable vertically relative to said unsprung part distances varying according to the different loads carried by the sprung part, and a fluid pressure brake equipment carried by said sprung part and conditionable according to the distance the sprung part moves vertically relative to the unsprung part for operation to provide the braking power called for by the load carried, of a mechanism carried by said sprung part and adapted to cooperate with said unsprung part for conditioning said fluid pressure brake equipment, said mechanism comprising a member cooperating with said fluid pressure brake equipment and being movable to condition the equipment, a measuring element carried by one of said parts adapted to be moved into engagement with the other of said parts and to determine according to the degree of movement of the element the position to which said member shall be moved, means for biasing said member toward empty position, fluid pressure responsive means operable to move said element into said engagement, and a second fluid pressure responsive means incapable of overpowering the first and arranged to shift said member toward full load position.

2. The combination with a vehicle having a sprung part and an unsprung part, said sprung part being movable vertically relative to said unsprung part distances varying according to different loads carried by the sprung part, and a fluid pressure brake equipment carried by said sprung part and conditionable according to the distance the sprung part moves vertically relative to the unsprung part for operation to provide the braking power called for by the load carried, of a mechanism carried by said sprung part and adapted to cooperate with said unsprung part for conditioning said fluid pressure brake equipment, said mechanism comprising a member cooperating with said fluid pressure brake equipment and being movable between an empty position and a load position to condition the fluid pressure brake equipment, a measuring element carried by said sprung part adapted to be moved into engagement with said unsprung part and to determine accordingly the position to which said member shall be moved, a fluid pressure responsive means operable to bias said member toward its empty position, another means responsive to fluid pressure to operate said measuring element, and a third fluid pressure responsive means operative as an incident to the operation of said other means to actuate said member out of said empty position into engagement with said other means to be adjusted thereby according to load.

3. The combination with a vehicle having a sprung part and an unsprung part, said sprung part being movable vertically relative to said unsprung part distances varying according to different loads carried by the sprung part, and a fluid pressure brake equipment carried by said sprung part and conditionable according to the distance the sprung part moves vertically relative to the unsprung part for operation to provide the braking power called for by the load carried, of a mechanism carried by said sprung part and adapted to cooperate with said unsprung part for conditioning said fluid pressure brake equipment, said mechanism comprising a member cooperating with said fluid pressure brake equipment and being movable between an empty position and a load position to condition the fluid pressure brake equipment, a measuring element carried by said sprung part adapted to be moved into engagement with said unsprung part and to determine accordingly the position to which said member shall be moved, means responsive to fluid pressure to actuate said measuring element into engagement with the unsprung part, and movable abutment means responsive to the pressure of fluid supplied to the aforesaid means to first bias said member toward the empty position and then as an incident to the operation of the aforesaid means to bias said member toward load position.

4. The combination with a vehicle having a sprung part and an unsprung part, said sprung part being movable vertically relative to said unsprung part distances varying according to different loads carried by the sprung part, and a fluid pressure brake equipment carried by said sprung part and conditionable according to the distance the sprung part moves vertically relative to the unsprung part for operation to provide the braking power called for by the load carried, of a mechanism carried by said sprung part and adapted to cooperate with said unsprung part for conditioning said fluid pressure brake equipment, said mechanism comprising a member cooperating with said fluid pressure brake equipment and being movable between an empty position and a load position to condition the fluid pressure brake equipment, a measuring element carried by said sprung part adapted to be moved into engagement with said unsprung part and to determine accordingly the position to which said member shall be moved, fluid pressure responsive means for first biasing said member toward empty position, then to initiate the movement of said measuring element, and thereafter to bias said member toward load position, said member then being operable thereafter by the means toward empty position until the measuring element engages the unsprung part.

5. In a vehicle variable load brake apparatus having a brake pipe in which the pressure of fluid may be varied for controlling the application of the brakes, an adjusting mechanism for varying the degree of brake application for a given brake pipe reduction according to the weight of the load on the vehicle, fluid pressure motor means for actuating said adjusting mechanism, and a cut-off valve device for controlling the supply of fluid under pressure from the brake pipe to said fluid pressure motor means comprising in combination, valve means having a cut-in position in which fluid under pressure from the brake pipe is supplied to said motor means and being operative to a cut-off position in which the supply of fluid under pressure to said motor means is cut off and said motor means is connected to atmosphere, one means responsive to brake pipe pressure to urge said valve means toward its cut-off position, spring means biasing said valve means toward its cut-in position, and another means responsive to brake pipe pressure to increase the value of said spring means, said valve means being operative in its cut-in position to connect said brake pipe to said other means and operative in its cut-off position to disconnect brake pipe from said other means and to connect said other means to atmosphere.

6. In a vehicle variable load brake apparatus having a brake pipe in which the pressure of fluid may be varied for controlling the application of the brakes, an adjusting mechanism for varying the degree of brake application for a given brake pipe reduction according to the weight of the load on the vehicle, fluid pressure motor means for actuating said adjusting mechanism, and cut-off valve device for controlling the supply of fluid under pressure from the brake pipe to said fluid pressure motor means comprising in combination, a diaphragm assemblage comprising a pair of positively connected diaphragms serving to define a chamber which is in constant open communication with the brake pipe, a valve disposed in said chamber operable by said assemblage to either a cut-in position in which said chamber is connected to said motor means or to a cut-off position in which said chamber is disconnected from said motor means and said motor means is connected to atmosphere, said assemblage being responsive to brake pipe pressure in either position to urge said valve toward the cut-off position, spring means biasing the assemblage toward the cut-in position, and movable abutment means operative in response to fluid pressure to increase the value of said spring, said valve being effective in its cut-in position to connect said chamber to said movable abutment means and effective in its cut-off position to connect said movable abutment means to atmosphere.

7. In a vehicle variable load brake apparatus having a brake pipe in which the pressure of fluid may be varied for controlling the application of the brakes, an adjusting mechanism for varying the degree of brake application for a given brake pipe reduction according to the weight of the load on the vehicle, fluid pressure motor means for actuating said adjusting mechanism, and a cut-off valve device for controlling the supply of fluid under pressure from the brake pipe to the fluid pressure motor means comprising in combination, a diaphragm assemblage comprising a pair of positively connected diaphragms serving to define a chamber which is in constant open communication with the brake pipe, a valve disposed in said chamber operable by said assemblage to either a cut-in position in which said chamber is connected to said motor means or to a cut-off position in which said chamber is cut off from said motor means and said motor means is connected to atmosphere, said assemblage being responsive to fluid pressure to urge said assemblage toward said cut-off position, spring means biasing said assemblage toward said cut-in position, means responsive to fluid pressure to increase the value of said spring means, said valve being operative in its cut-in position to subject said assemblage to fluid pressure and to connect said chamber to said means and operative in its cut-off position to connect said means to atmosphere and to subject said assemblage to the pressure of fluid in said chamber.

8. In a fluid pressure operated load compensating brake equipment, the combination with a brake pipe and a fluid pressure responsive load measuring mechanism, of a cut-off valve device comprising a casing having two passages through which fluid under pressure may flow from the brake pipe to the load measuring mechanism, a valve mounted in said casing operative to one position to close communication between said passages and operative to another position to open communication between said passages, means responsive to an increase to a chosen degree in the pressure of fluid in the brake pipe to actuate said valve to its closed position, and means responsive to a reduction in the pressure of fluid in the brake pipe to a predetermined degree lower than said chosen degree to actuate said valve to its open position.

9. In a load compensating mechanism for a vehicle fluid pressure brake equipment, a variable leverage ratio relay valve mechanism comprising a member adjustable for conditioning the fluid pressure brake equipment for operation to provide the braking power called for by the load carried, a measuring mechanism operable to a position for ascertaining the amount of load carried and adjusting said member to a corresponding position, motor means responsive to an increase in the pressure of fluid supplied thereto to actuate said mechanism to said position, a source of supply of fluid under pressure for operating said motor means, and locking means interposed between said source and said motor means operative to unlatch said member before admitting fluid under pressure from said source to said motor means, said locking means comprising a valve normally closing communication between said source and said motor means and operable to an unseated position to open said communication, a latch, resilient means normally holding said latch in locking engagement with said member, and movable abutment means responsive to an increase in the pressure of fluid at said source to a chosen degree to first actuate said latch out of said locking engagement and then to unseat said valve.

10. In a variable load brake apparatus having a brake pipe in which the pressure of fluid may be varied and a brake controlling valve device operative in response to variations in the pressure of fluid in said brake pipe to supply fluid at various pressures for effecting various degrees of brake applications, an adjusting mechanism for varying the degree of brake application for a given brake pipe reduction according to the weight of the load on the vehicle, fluid pressure motor means for actuating said adjusting mechanism, and lock-out means for controlling a fluid pressure supply communication between said brake pipe and said motor means, said lock-out means comprising a valve operative to open and close said communication, and movable abutment means responsive to the pressure of fluid supplied by said brake controlling valve device when above a chosen degree to actuate said valve to close said communication.

11. In a variable load brake apparatus having a brake pipe in which the pressure of fluid may be varied and a brake controlling valve device operative in response to variations in the pressure of fluid in said brake pipe to supply fluid at various pressures for effecting various degrees of brake application, an adjusting mechanism for varying the degree of brake application for a given brake pipe reduction according to the weight of the load on the vehicle, fluid pressure motor means for actuating said adjusting mechanism, and lock-out means for preventing operation of said motor means during a brake application, said lock-out means comprising one valve having a seated position in which communication between the brake pipe and the motor means is closed and operable to an unseated position in which said communication is open, another valve having one position in which communication between the motor means and the atmosphere is open and operable to another position in which the latter mentioned communication is closed, resilient means urging said one valve toward its seated position and said other valve toward its unseated position, and movable abutment means interposed between said valves responsive to fluid supplied from the brake controlling valve device above a chosen degree to hold said one valve seated and to permit the resilient means to unseat said second valve and responsive to brake pipe pressure when the fluid pressure supplied from the brake controlling valve device is below said chosen degree to unseat said one valve and seat said other valve.

12. A measuring mechanism for a variable load brake equipment for a vehicle having a sprung body part and an unsprung truck part which is capable of angular movement in a horizontal plane relative to the sprung part, said measuring mechanism comprising a measuring element carried by said sprung part in horizontally and vertically spaced relationship to said unsprung truck part and movable into overlapping relationship and engagement with a peripheral surface of the unsprung truck part at a point in the vertical center plane through said part regardless of the position of said sprung part with relation to said unsprung part for conditioning the brake equiment for operation to provide the braking called for by the load, means operative to actuate said measuring element into overlapping relation with the unsprung truck part, and means operative thereafter to actuate said measuring element into stopping engagement with the unsprung truck part.

13. In a device for measuring the relative change in the vertical distance between a sprung and an unsprung part of a vehicle, the combination with an unsprung truck part which is capable of angular movement in a horizontal plane relative to the sprung part, of a measuring element carried by said sprung part and having a surface which is in substantially parallel relation with the horizontal center plane of said unsprung truck part, means operative to actuate said measuring element horizontally into a position in which it overlaps said truck part, means operative to actuate said element and thereby surface vertically into engagement with said truck part at a point where the vertical center plane therethrough will intersect the periphery of said portion and being effective to maintain said parallel relation at all times, and a member operable by the last mentioned means to indicate the degree of vertical movement of said element.

14. The combination with a vehicle having a sprung part and an unsprung part, said sprung part being movable vertically relative to said unsprung part distances varying according to different loads carried by the sprung part, and a fluid pressure brake equipment carried by said sprung part and conditionable according to the distance the sprung part moves vertically relative to the unsprung part for operation to provide the braking power called for by the load carried, of a mechanism carried by said sprung part and adapted to cooperate with said unsprung part for conditioning said fluid pressure brake equipment, said mechanism comprising a control member having an empty position, a full load position and being adjustable therebetween to condition the equipment, a measuring element carried by said sprung part and adapted to be moved into engagement with said unsprung part for correspondingly positioning said control member, fluid pressure responsive means for biasing said control member toward said empty position, other fluid pressure responsive means operable to move said element into said engagement and capable of overpowering the first mentioned fluid pressure responsive means to shift said control member from said empty position in the direction of said full load position to a position corresponding to the load on said vehicle, and a fluid pressure connection for simultaneously supplying fluid under pressure to and releasing fluid under pressure from both of said fluid pressure means.

15. In a vehicle variable load brake apparatus having a brake pipe in which the pressure of fluid may be varied for controlling the application of the brakes, an adjusting mechanism for varying the degree of brake application for a given brake pipe reduction according to the weight of the load on the vehicle, fluid pressure motor means for actuating said adjusting mechanism, and a cut-off valve device for controlling the supply of fluid under pressure from the brake pipe to said fluid pressure motor means comprising in combination, valve means having a cut-in position in which fluid under pressure from the brake pipe is supplied to said motor means and being operative to a cut-off position in which the supply of fluid under pressure to said motor means is cut off and said motor means is connected to atmosphere, pressure means for moving said valve means to said cut-in position, actuating means subject to opposing pressures of said pressure means and pressure of fluid in said brake pipe operative upon an increase in brake pipe pressure to a chosen degree to overcome said pressure means for moving said valve means to said cut-off position, and means controlled by said valve means for reducing the effectiveness of said pressure means with respect to the opposing brake pipe pressure on said actuating means in said cut-off position and for increasing the effectiveness of said pressure means with respect to the opposing brake pipe pressure in said cut-in position.

16. In a vehicle variable load brake apparatus having a brake pipe in which the pressure of fluid may be varied for controlling the application of the brakes, an adjusting mechanism for varying the degree of brake application for a given brake pipe reduction according to the weight of the load on the vehicle, fluid pressure motor means for actuating said adjusting mechanism, and a cut-off valve device for controlling the supply of fluid under pressure from the brake pipe to said fluid pressure motor means comprising a diaphragm subject on one side to pressure of fluid in a chamber which is in constant open communication with the brake pipe, a valve disposed in said chamber having a cut-in position in which said chamber is connected to said motor means and operable by said diaphragm to a cut-off position in which said chamber is disconnected from said motor means and said motor means is connected to atmosphere, spring means biasing said diaphragm and valve toward said cut-in position, and movable abutment means operative in response to fluid pressure to increase the value of said spring means on said diaphragm, said valve being effective in its cut-in position to connect said chamber to said movable abutment means and effective in its cut-off position to connect said movable abutment means to atmosphere.

17. In a vehicle variable load brake apparatus, in combination, a brake pipe, brake controlling means operative upon a reduction in pressure in said brake pipe to effect an application of brakes on said vehicle, an adjustable mechanism for limiting the degree of said brake application in accordance with the degree of load carried by the vehicle, motor means operable by fluid under pressure for adjusting said mechanism, latch means for holding said mechanism in an adjusted position and adapted to be rendered ineffective upon a supply of fluid under pressure to a control chamber, a slide valve disposed in a valve chamber open to said brake pipe and having a cut-in position and a cut-off position, a passage connecting said control chamber to the seat of said slide valve, a second passage for conducting fluid under pressure supplied from said valve chamber to said motor means, a third passage connecting said motor means to said seat, a reset reservoir, said slide valve in said cut-in position opening the first named passage, said second passage and said reset reservoir to fluid under pressure which may be supplied from said valve chamber and in said cut-off position opening all of said passages to atmosphere, choke means for restricting the flow of fluid under pressure from said third passage and said reset reservoir to atmosphere, a valve in said second passage for controlling flow of fluid under pressure therethrough toward said motor means, resilient means biasing the latter valve toward its seated position, means operative by said latch means to open said latter valve subsequent to said latch means being rendered ineffective, choke means for restricting flow of fluid under pressure from said brake pipe to said valve chamber, and means controlled by pressure of fluid in said brake pipe operative upon an increase in pressure therein to a chosen degree to move said slide valve to said cut-off position and upon a reduction in brake pipe pressure to a chosen lower degree to move said slide valve to said cut-in position.

18. In a vehicle variable load brake apparatus, in combination, a brake pipe, brake controlling means operative upon a reduction in pressure in said brake pipe to effect an application of brakes on said vehicle, an adjustable mechanism for limiting the degree of said brake application in accordance with the degree of load carried by the vehicle, motor means operable by fluid under pressure for adjusting said mechanism, latch means for holding said mechanism in an adjusted position and adapted to be rendered ineffective upon supply of fluid under pressure to a control chamber, a slide valve disposed in a valve chamber open to said brake pipe and having a cut-in position and a cut-off position, a passage connecting said control chamber to the seat of said slide valve, a second passage for conducting fluid under pressure supplied from said valve chamber to said motor means, a third passage for connecting said motor means to said seat, a reset reservoir, choke means for restricting flow of fluid under pressure from said valve chamber to said reset reservoir, said slide valve in said cut-in position opening the first named passage, said second passage and said reset reservoir to fluid under pressure which may be supplied from said valve chamber and in said cut-off position opening all of said passages to atmosphere, choke means for restricting the flow of fluid under pressure from said third passage to atmosphere, a valve in said second passage for controlling flow of fluid under pressure therethrough toward said motor means, resilient means biasing the latter valve toward its seated position, means operative by said latch means to open the latter mentioned valve subsequent to the latch means being rendered ineffective, choke means for restricting flow of fluid under pressure from said brake pipe to said valve chamber, and means controlled by pressure of fluid in said brake pipe operative upon an increase in pressure therein to a chosen degree to move said slide valve to said cut-off position and upon a reduction in brake pipe pressure to a chosen lower degree to move said slide valve to said cut-in position.

19. In a variable load vehicle brake equipment, a brake pipe, first and second brake cylinder pipes, a brake controlling valve device operable upon a reduction in pressure of fluid in said brake pipe to supply fluid under pressure to said first brake cylinder pipe and upon an increase in pressure in said brake pipe to release fluid under pressure from said first brake cylinder pipe, a relay comprising a balancing lever having a fulcrum, two movable abutments subject, respectively and opposingly, to pressure of fluid in said first and second brake cylinder pipes and connected to said lever, and valve means controlled by said lever for varying pressure of fluid in said second brake cylinder pipe according to variations in the pressure of fluid in said first brake cylinder pipe, motor means responsive to pressure of fluid supplied from said brake pipe to adjust said fulcrum relative to said lever for varying the effectiveness of said valve means according to the load on the vehicle, a communication through which fluid under pressure is adapted to be supplied from said brake pipe to said motor means, and lockout means for preventing the adjustment of said fulcrum until said lever is substantially relieved of the forces exerted by said movable abutments, said lock-out means comprising a valve operative to open and close said communication, and movable abutment means responsive to the pressure of fluid in said first brake cylinder pipe when above a chosen low degree to actuate said valve to close said communication.

20. In a variable load vehicle brake equipment, a brake pipe, first and second brake cylinder pipes, a brake controlling valve device operable upon a reduction in pressure of fluid in said brake pipe to supply fluid under pressure to said first brake cylinder pipe and upon an increase in pressure in said brake pipe to release fluid under pressure from said first brake cylinder pipe, a relay valve device comprising a balancing lever having a fulcrum, two movable abutments subject, respectively and opposingly, to pressure of fluid in said first and second brake cylinder pipes and connected to said lever, and valves means controlled by said lever for varying pressure of fluid in said second brake cylinder pipe according to variations in the pressure of fluid in said first brake cylinder pipe, said fulcrum being adjustable relative to said lever for varying the effectiveness of said valve means according to the load on the vehicle, motor means responsive to pressure of fluid supplied from said brake pipe to adjust said fulcrum according to the load on the vehicle, a communication through which fluid under pressure is supplied from said brake pipe to said motor means, and lock-out means operative in response to fluid pressure after a brake application has been effected, to prevent adjusting of said fulcrum until the forces acting on said beam have been substantially relieved.

21. In a vehicle variable load brake apparatus, in combination, a brake pipe, a fluid pressure responsive load measuring mechanism, a timing reservoir, a cut-off valve device comprising a casing having a valve chamber, a passage through which fluid under pressure is supplied from said brake pipe to said chamber, choke means in said passage for restricting the flow of fluid under pressure therethrough, a valve mounted in said chamber having a cut-in position in which fluid under pressure in said chamber may be supplied to said mechanism and said timing reservoir, said valve being operable to a cut-off position in which said mechanism and said reservoir are disconnected from said chamber, and said reservoir and said mechanism are connected to atmosphere, and means responsive to an increase in pressure of fluid in said brake pipe to a chosen degree to actuate said valve to its cut-off position and responsive to a reduction in the pressure of fluid in said brake pipe to a predetermined degree lower than said chosen degree to actuate said valve to its cut-in position.

22. In a vehicle variable load brake apparatus, in combination, a brake pipe, a fluid pressure responsive load measuring mechanism, a timing reservoir, a cut-off valve device comprising a casing having a valve chamber, a passage through which fluid under pressure is supplied from said brake pipe to said chamber, choke means in said passage for restricting the flow of fluid under pressure therethrough, a valve mounted in said chamber having a cut-in position in which fluid under pressure in said chamber may be supplied to said mechanism and said timing reservoir, said valve being operable to a cut-off position in which said mechanism and said reservoir are disconnected from said chamber and said reservoir and said mechanism are connected to atmosphere, choke means for restricting the flow of fluid under pressure from said mechanism to atmosphere, and means responsive to an increase in pressure of fluid in said brake pipe to a chosen degree to actuate said valve to its cut-off position and responsive to a reduction in the pressure of fluid in said brake pipe to a predetermined degree lower than said chosen degree to actuate said valve to its cut-in position.

23. In a vehicle variable load brake apparatus, in combination, a brake pipe, a brake controlling valve device operative upon a reduction in pressure of fluid in said brake pipe to effect an application of the brake on said vehicle, an adjustable mechanism for varying the degree of brake application in accordance with the degree of load carried by the vehicle, motor means operable in response to fluid pressure to adjust said mechanism, locking means for holding said mechanism in an adjusted position, actuating means operative in response to fluid pressure to render said locking means ineffective, valve means operable by said actuating means upon rendering said locking means ineffective to effect a supply of fluid under pressure to said motor means, a timing reservoir, and a cut-off valve device comprising a casing having a valve chamber, a passage through which fluid under pressure is supplied from said brake pipe to said chamber, a valve mounted in said chamber having a cut-in position in which fluid under pressure in said chamber may be supplied to said actuating means and said timing reservoir, said valve being operable to a cut-off position in which said mechanism and said reservoir are disconnected from said chamber and connected to atmosphere, choke means for restricting the flow of fluid under pressure from said timing reservoir and said motor means whereby said locking means is rendered effective before said motor means is rendered ineffective, and means responsive to an increase in pressure of fluid in said brake pipe to a chosen degree to actuate said valve to its cut-off position and responsive to a reduction in the pressure of fluid in said brake pipe to a predetermined degree lower than said chosen degree to actuate said valve to its cut-in position.

24. In a vehicle variable load brake apparatus, in combination, a brake pipe, a brake controlling valve device operative upon a reduction in pressure of fluid in said brake pipe to effect an application of the brake on said vehicle, an adjustable mechanism for varying the degree of brake application in accordance with the degree of load carried by the vehicle, motor means operable in response to fluid pressure to adjust said mechanism, locking means for holding said mechanism in an adjusted position, actuating means for rendering said locking means effective and ineffective, valve means for controlling said actuating means operative upon rendering said locking means ineffective to effect a supply of fluid under pressure to actuate said motor means, means operative upon operation of said actuating means to render said locking means effective to release fluid under pressure from said motor means, and means for retarding the release of fluid under pressure from said motor means.

25. In a vehicle variable load brake apparatus, in combination, a brake pipe, a brake controlling valve device operative upon a reduction in pressure of fluid in said brake pipe to effect an application of the brakes on said vehicle, a relay valve device comprising an adjustable fulcrum for varying the degree of said application in accordance with the degree of load on said vehicle, motor means operable in response to fluid pressure for adjusting said fulcrum, locking means for holding said fulcrum in an adjusted position, said locking means comprising a supply chamber, a delivery chamber, a valve for controlling communication between said supply chamber and said delivery chamber, an actuating means operable in response to fluid pressure to render said locking means ineffective and to actuate said valve to open said communication, a timing reservoir, a lockout valve device comprising a valve chamber, a valve disposed in said valve chamber for controlling communication between said valve chamber and said timing reservoir, and movable abutment means operative in response to a chosen degree of pressure of fluid supplied by said brake controlling valve device to actuate said valve to close said communication, and a cut-out valve device comprising a casing having therein a slide valve chamber open to said brake pipe, choke means for restricting the flow of fluid under pressure from said brake pipe to said slide valve chamber, a slide valve disposed in said slide valve chamber having a cut-in position and a cut-off position, a passage connecting said timing reservoir to the seat of said slide valve, a second passage connecting said motor means and said delivery chamber of said locking means to said seat, a third passage connecting said actuating means to said seat, a fourth passage connecting said supply chamber of said locking means to said seat, and a fifth passage connecting said valve chamber of said lockout valve device to said seat, and choke means in said slide valve for restricting the flow of fluid under pressure from said motor means to atmosphere, said slide valve in said cut-in position opening the first mentioned passage to said slide valve chamber and opening said fifth passage to said third and fourth passages, and in said cut-off position disconnecting the first mentioned passage from said slide valve chamber and connecting the other of said passages to atmosphere.

26. In a vehicle variable load brake apparatus, in combination, a brake pipe, a brake controlling valve device operative upon a reduction in pressure of fluid in said brake pipe to effect an application of the brakes on said vehicle, a relay valve device comprising an adjustable fulcrum for varying the degree of said application in accordance with the degree of load on said vehicle, motor means operable in response to fluid pressure for adjusting said fulcrum, locking means for holding said fulcrum in an adjusted position, said locking means comprising a supply chamber, a delivery chamber, a valve for controlling communication between said supply chamber and said delivery chamber, and actuating means operable in response to fluid pressure to render said locking means ineffective and to actuate said valve to open said communication, a timing reservoir, a lock-out valve device comprising a valve chamber, a valve disposed in said valve chamber for controlling communication between said valve chamber and said timing reservoir, and movable abutment means operative in response to a chosen degree of pressure of fluid supplied by said brake controlling valve device to actuate said valve to close said communication, and a cut-off valve device comprising a casing having a slide valve chamber open to said brake pipe, means for restricting flow of fluid under pressure from said brake pipe to said slide valve chamber, a slide valve disposed in said slide valve chamber having a cut-in position and a cut-off position, a passage connecting said timing reservoir to the seat of said slide valve, a second passage connecting said motor means and said delivery chamber of said locking means to said seat, a third passage connecting said actuating means to said seat, a fourth passage connecting said supply chamber of said locking means to said seat, a fifth passage connecting said valve chamber of said lock-out valve device to said seat, said slide valve in said cut-in position opening the first mentioned passage to said slide valve chamber and opening said fifth passage to said third and fourth passages, and in said cut-off position disconnecting the first mentioned passage from said slide valve chamber and connecting all of said passages to atmosphere, and choke means for restricting the flow of fluid under pressure from said valve chamber to said timing reservoir.

27. In a vehicle variable load brake apparatus, in combination, a brake pipe, a brake controlling valve device operative upon a reduction in pressure of fluid in said brake pipe to effect an application of the brake on said vehicle, a relay valve device comprising an adjustable fulcrum for varying the degree of said application in accordance with the degree of load on said vehicle, motor means operable in response to fluid pressure for adjusting said fulcrum, locking means for holding said fulcrum in an adjusted position, said locking means comprising a lock, a supply chamber, a delivery chamber, a valve for controlling communication between said chambers, a diaphragm connected to and of greater area than said valve subject to the pressure of fluid in said delivery chamber, a spring urging said valve toward a position for closing said communication, an actuating means operable in response to fluid pressure to render said lock ineffective and to actuate said valve against the pressure of said spring to open said communication, and a cut-off valve device comprising a casing having a slide valve chamber, a slide valve disposed in said slide valve chamber having a cut-in position and a cut-off position, a passage connecting said motor means and said delivery chamber of said locking means to the seat of said slide valve, a second passage connecting said actuating means to said seat, a third passage connecting said supply chamber of said locking means to said seat, said slide valve in said cut-in position connecting fluid under pressure supplied from said brake pipe to said passages and in said cut-off position connecting said passages to atmosphere.

28. In a vehicle variable load brake apparatus, in combination, a brake pipe, a brake controlling valve device operative upon a reduction in pressure of fluid in said brake pipe to effect an application of the brakes on said vehicle, a relay valve device comprising an adjustable fulcrum for varying the degree of said application in accordance with the degree of load on said vehicle, motor means operable in response to fluid pressure for adjusting said fulcrum, locking means for holding said fulcrum in an adjusted position, said locking means comprising a lock, a supply chamber, a delivery chamber, a valve for controlling communication between said chambers, a diaphragm positively connected to and of greater area than said valve subject to the pressure of fluid in said delivery chamber, a spring urging said valve toward a position for closing said communication, an actuating means operable in response to fluid pressure to render said lock ineffective and to actuate said valve against the pressure of said spring to open said communication, a cut-off valve device comprising a casing having a slide valve chamber, a slide valve disposed in said slide valve chamber having a cut-in position and a cut-off position, a passage connecting said motor means and said delivery chamber of said locking means to the seat of said slide valve, a second passage connecting said actuating means to said seat, a third passage connecting said supply chamber of said locking means to said seat, said slide valve in said cut-in position connecting fluid under pressure supplied from said brake pipe to said passages and in said cut-off position connecting said passages to atmosphere, and means for restricting the release of fluid under pressure from said motor means with respect to release of fluid under pressure from said locking means.

29. In a vehicle variable load brake apparatus, in combination, a brake pipe, a brake controlling valve device operative upon a reduction in pressure of fluid in said brake pipe to supply fluid under pressure for effecting an application of the brakes on said vehicle, a relay valve device comprising an adjustable fulcrum for varying the degree of said application in accordance with the degree of load on the vehicle, motor means operable in response to fluid pressure for adjusting said fulcrum, valve means operable in response to fluid pressure to supply fluid under pressure to said motor means, a cut-off valve device having a cut-in position in which fluid under pressure is supplied from said brake pipe to said valve means and operable upon an increase in the pressure of fluid in said brake pipe to a cut-off position in which said motor means and said valve means are open to atmosphere, and a lock-out valve device for controlling the supply of fluid under pressure from said brake pipe to said cut-off valve device and said valve means for operation of said motor means, said lock-out valve device comprising a valve chamber in open communication with said cut-off valve device, one passage through which fluid under pressure may be supplied to said valve chamber, one valve mounted in said valve chamber for controlling communication between said passage and said valve chamber, a second passage leading to said cut-off valve device through which fluid under pressure may flow from said motor means and said valve means to atmosphere, a second valve mounted in said second passage for controlling communication thereto, a control chamber to which fluid under pressure may be supplied from said brake controlling valve device, a movable abutment interposed between and serving to define said valve chamber and said control chamber operatively engaging said valve, and resilient means urging said diaphragm and said valves toward a position in which said one valve closes the first mentioned communication and said second valve opens said second mentioned communication, said valves and said diaphragm being operative upon an increase in the pressure of fluid in said one passage to a degree greater than a certain low degree of pressure in said control chamber to a position in which said one valve opens the first mentioned communication and said second valve closes the second mentioned communication.

30. In a vehicle variable load fluid pressure brake apparatus, in combination, a brake pipe, a brake controlling valve device operative upon a reduction in the pressure of fluid in said brake pipe to supply fluid under pressure for effecting an application of the brakes on said vehicle, a relay valve device comprising an adjustable fulcrum for varying the degree of said application in accordance with the degree of load on the vehicle, motor means operable in response to fluid pressure for adjusting said fulcrum, valve means operable in response to fluid pressure to supply fluid under pressure to said motor means, a cut-off valve device having a cut-in position in which fluid under pressure is supplied from said brake pipe to said valve means and operable upon an increase in the pressure of fluid in said brake pipe to a cut-off position in which said motor means and said valve means are opened to atmosphere, and a lock-out valve device for controlling the supply of fluid under pressure from said brake pipe to said cut-off valve device and said valve means for operation of said motor means, said lock-out valve device comprising a delivery chamber in open communication with said cut-off valve device, one passage through which fluid under pressure may be supplied to said delivery chamber, a second passage leading to said cut-off valve device for establishing a communication through which fluid under pressure may flow from said motor means and said valve means to atmosphere, a control chamber to which fluid under pressure may be supplied from said brake controlling valve device, and fluid pressure responsive valve means having a position in which the first mentioned communication is closed and the second mentioned communication is open and operative upon an increase in the pressure of fluid in said one passage to a degree greater than a certain low degree of pressure of fluid in said control chamber to a position in which said first mentioned communication is open and the second mentioned communication is closed.

31. A measuring mechanism for a variable load brake equipment for a vehicle having a sprung body part and an unsprung truck part which is capable of angular movement in a horizontal plane relative to the sprung part, said measuring mechanism comprising a measuring element carried by said sprung part and having a normal position disposed in spaced relation to and at one side of said unsprung part and movable relatively to said unsprung part substantially horizontally into vertically spaced relation from said unsprung part and then movable vertically into engagement with said unsprung part for conditioning said brake equipment for operation to provide a braking force corresponding to the load on said vehicle, means for moving said element to said normal position, and means for moving said element from said normal position into engagement with said unsprung part.

32. A measuring mechanism for a variable load brake equipment for a vehicle having a sprung body part and an unsprung truck part which is capable of angular movement in a horizontal plane relative to the sprung part, said measuring mechanism comprising a measuring element disposed in horizontally and vertically spaced relationships to said unsprung truck part and rotatable horizontally to a position spaced vertically only away from said unsprung truck part and movable vertically into engagement with said unsprung truck part regardless of the position of said sprung part with relation to said unsprung part for conditioning said brake equipment for operation to provide a braking force corresponding to the load on the vehicle, means operative to rotate said measuring element horizontally to said position, and means operative thereafter to actuate said measuring element into stopping engagement with said unsprung truck part.

33. In a device for measuring the relative change in the vertical distance between a sprung and an unsprung part of a vehicle, the combination with an unsprung truck part which is capable of angular movement in a horizontal plane relative to said sprung part, of a measuring element carried by said sprung part and having a shoe with a surface which is in substantially parallel relation with the horizontal center plane of said unsprung truck part, said shoe surface being rotatable horizontally to a position in vertically spaced relation only from said unsprung truck part and movable vertically into engagement with said unsprung truck part regardless of the position of the sprung part with relation to the unsprung truck part, means operative to actuate said element and thereby said shoe surface horizontally to said position and thereafter vertically into engagement with said truck part at a point where the vertical center plane therethrough will intersect the periphery of said unsprung truck part and being effective to maintain said parallel relationship at all times, and a member operable by the last mentioned means to indicate the degree of vertical movement of said element.

34. In a vehicle variable load brake apparatus, in combination, a brake pipe, a brake controlling valve device operative upon a reduction in pressure of fluid in said brake pipe to supply fluid under pressure for effecting an application of the brakes on said vehicle, a relay valve device comprising an adjustable fulcrum for varying the degree of said application in accordance with the degree of load on the vehicle, said vehicle having a sprung part and an unsprung part, a measuring mechanism carried by said sprung part comprising a measuring element disposed in horizontally and vertically spaced relationship to said unsprung part and rotatable horizontally to a position spaced vertically only away from said unsprung part and movable vertically into engagement with said unsprung part regardless of the position of the sprung part with relation to the unsprung part, motor means operable in response to fluid pressure for actuating said measuring mechanism, linkage means including a tortuous groove interposed between said motor means and said measuring element for actuating said measuring element, and a piston member responsive to the pressure of fluid supplied to said motor means to actuate said fulcrum to a position for braking an empty vehicle and responsive to the pressure of fluid supplied from said motor means to actuate said fulcrum to a position for braking a vehicle carrying a load as determined by the position of said measuring element.

35. In a vehicle variable load brake apparatus having a part to be adjusted for varying the braking power on a vehicle according to the vertical distance between a sprung and an unsprung part of said vehicle, a device for measuring relative change in the vertical distance between said sprung and unsprung parts and positioning said adjustable part accordingly, said device comprising a measuring element carried by said sprung part in horizontally and vertically spaced relationship to said unsprung truck part and movable into overlapping relationship and engagement with a peripheral surface of the unsprung truck part at a point in the vertical center plane through said part regardless of the position of said sprung part with relation to said unsprung part for conditioning the brake equipment to provide braking called for by the load, and means operative to actuate said measuring element into over-lapping relation and engagement with the unsprung truck part.

36. In a vehicle variable load brake equipment, a device for measuring the relative change in the vertical distance between a sprung part and an unsprung part of said vehicle and for positioning an adjustable member accordingly for varying the degree of braking power in accordance with the degree of load on the vehicle, said device comprising a measuring element having a stem slidably and rotatably mounted in a casing carried by said sprung part and operable into stopping engagement with said unsprung part, a first fluid pressure responsive piston means for actuating said measuring element, said piston means having a stem mounted in said casing in axially parallel relationship to the first mentioned stem, a lever rockably mounted in said casing for effecting an operative connection between the adjacent end surfaces of said stems, a second fluid pressure responsive means for ascertaining the position of said stems when said measuring element is in said stopping engagement and for actuating said adjustable member to a corresponding position, said second fluid pressure responsive piston means comprising a piston having a stem in axially parallel relationship to the other stems, and a second lever mounted in said casing operatively connected at one end to an end of the last mentioned stem opposite to its piston, means for supplying fluid under pressure to one side of said piston for actuating said piston and thereby said adjustable member to a position for conditioning said brake equipment to provide power for braking an empty vehicle, and means operative as an incident to the operation of the first mentioned piston means to supply fluid under pressure to the other side of said piston to cause said piston to actuate said member toward a position for braking a loaded vehicle and to rock said lever until the opposite end of said lever engages the adjacent end of the second mentioned stem, the power of the first mentioned piston means being capable of prevailing over the power of said second piston means.

37. In a vehicle variable load brake equipment, a brake pipe, a device for measuring the relative change in the vertical distance between a sprung part and an unsprung part of said vehicle and for positioning an adjustable member accordingly for varying the degree of braking power in accordance with the degree of load on the vehicle, said device comprising a measuring element carried by said sprung part and operable into stopping engagement with said unsprung part, motor means responsive to the pressure of fluid supplied from said brake pipe for actuating said measuring element, and a piston member for determining the adjusted position of said measuring element and for positioning said adjustable member accordingly, said member comprising a small piston and a large piston positively attached together and serving to define between them a chamber to which fluid under pressure may be supplied from said brake pipe and operable thereby to actuate said adjustable member to a position to condition the equipment for braking an empty vehicle, and means for supplying fluid under pressure from said motor means to the other side of said large piston for actuating said piston member to a position for conditioning said equipment for braking the vehicle in accordance with the load on said vehicle.

38. In a fluid pressure brake, in combination, a brake pipe, first and second brake cylinder pipes, valve means operable upon a reduction in pressure in said brake pipe to supply fluid under pressure to said first brake cylinder pipe and upon an increase in pressure in said brake pipe to release fluid under pressure from said first brake cylinder pipe, a relay valve device operative in response to a supply of fluid under pressure thereto to supply fluid under pressure to said second brake cylinder pipe and upon a release of fluid under pressure therefrom to release fluid under pressure from said second brake cylinder pipe, and a pilot valve device for controlling the supply of fluid under pressure to and release of fluid under pressure from said relay valve device, said pilot valve device comprising movable abutment means having differential areas subject on one side to the pressure of fluid supplied to said first brake cylinder pipe and on the other side to the pressure of fluid supplied to said relay valve device, a valve assemblage for controlling a communication through which fluid under pressure may be supplied from said first brake cylinder pipe to said relay valve device, a passage connecting said communication to said other side of said movable abutment means, and a flow restricting means in said passage, said valve assemblage being operable by said movable abutment means in response to an increase in the pressure of fluid in said first brake cylinder pipe to open said first brake cylinder pipe to said communication and operable upon a decrease in the pressure of fluid in said first brake cylinder pipe to cut off said first brake cylinder pipe from said communication and to open said communication to atmosphere.

39. In a vehicle brake equipment, in combination, a brake pipe, a brake controlling means operative upon a reduction in pressure in said brake pipe to effect an application of the brakes on said vehicle, an adjustable member for limiting the degree of said brake application in accordance with the degree of load carried by the vehicle, motor means operable by fluid under pressure for adjusting said mechanism, a cut-off valve device for controlling the flow of fluid under pressure from said brake pipe to said motor means, said cut-off valve device comprising a slide valve disposed in a valve chamber open to said brake pipe and having a cut-in position in which said brake pipe is connected to said motor means and a cut-out position in which said brake pipe is cut off from said motor means and connected to atmosphere, means controlled by pressure of fluid in said brake pipe operative upon an increase in the pressure therein to a chosen degree to move said slide valve to said cut-off position and upon a reduction in brake pipe pressure to a chosen lower degree to move said slide valve to said cut-in position, and means for restricting the flow of fluid under pressure from said brake pipe to said cut-off valve device.

40. In a variable load brake equipment, in combination, a brake pipe, brake controlling means operative upon a reduction in pressure in said brake pipe to effect an application of the brakes on said vehicle, an adjustable mechanism for limiting the degree of said brake application in accordance with the degree of load carried by the vehicle, motor means operable by fluid under pressure for adjusting said mechanism, a cut-off valve device for controlling the flow of fluid under pressure from said brake pipe to said motor means, said cut-off valve device comprising a valve chamber, a passage connecting said brake pipe to said valve chamber, a slide valve disposed in said chamber having a cut-in position in which said chamber is connected to said motor means and a cut-out position in which said chamber is cut-off from said motor means and connected to atmosphere, means controlled by the pressure of fluid in said brake pipe operative upon an increase in pressure therein to a chosen degree to move said slide valve to said cut-off position and upon a reduction in brake pipe pressure to a chosen lower degree to move said slide valve to said cut-in position, and choke means in said passage for restricting the flow of fluid under pressure therethrough.

41. In a vehicle variable load brake apparatus, in combination, a brake pipe, a brake controlling valve device operative upon a reduction in pressure of fluid in said brake pipe to effect an application of the brake on said vehicle, a relay valve device comprising an adjustable fulcrum for varying the degree of said application in accordance with the degree of load on said vehicle, motor means operable in response to fluid pressure for adjusting said fulcrum, locking means for holding said fulcrum in an adjusted position, said locking means comprising a supply chamber, a delivery chamber, a valve for controlling communication between said supply chamber and said delivery chamber, and actuating means operable in response to fluid pressure to render said locking means ineffective and to actuate said valve to open said communication, a timing reservoir, a lock-out valve device comprising a valve chamber, a valve disposed in said valve chamber for controlling communication between said valve chamber and said timing reservoir, and movable abutment means operative in response to a chosen degree of pressure of fluid supplied by said brake controlling valve device to actuate said valve to close said communication, and a cut-off valve device comprising a casing having a slide valve chamber open to said brake pipe, a slide valve disposed in said slide valve chamber having a cut-in position and a cut-off position, a passage connecting said timing reservoir to the seat of said slide valve, a second passage connecting said motor means and said delivery chamber of said locking means to said seat, a third passage connecting said adjusting means to said seat, a fourth passage connecting said supply chamber of said locking means to said seat, and a fifth passage connecting said valve chamber of said lock-out valve device to said seat, said slide valve in said cut-in position opening the first mentioned passage to said slide valve chamber and opening said fifth passage to said third and fourth passages, and in said cut-off position disconnecting the first mentioned passage from said slide valve chamber and connecting all of said mentioned passages to atmosphere.

GLENN T. McCLURE.

REFERENCES CITED

The following references are of record in the file of this patent:

UNITED STATES PATENTS

| Number | Name | Date |
|---|---|---|
| 2,130,633 | Rush | Sept. 20, 1938 |
| 2,364,927 | Sudduth | Dec. 12, 1944 |
| 2,408,123 | Pickert | Sept. 24, 1946 |
| 2,418,013 | Cook | Mar. 25, 1947 |